United States Patent
Harada et al.

(10) Patent No.: US 6,878,196 B2
(45) Date of Patent: Apr. 12, 2005

(54) INK, INK JET RECORDING METHOD AND AZO COMPOUND

(75) Inventors: Toru Harada, Minami-ashigara (JP); Yoshiharu Yabuki, Minami-ashigara (JP); Manabu Ogawa, Fujinomiya (JP); Hiroshi Iwanaga, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/342,177

(22) Filed: Jan. 15, 2003

(65) Prior Publication Data

US 2003/0213405 A1 Nov. 20, 2003

(30) Foreign Application Priority Data

Jan. 15, 2002 (JP) ........................................ 2002-006726
Jan. 15, 2002 (JP) ........................................ 2002-006733

(51) Int. Cl.[7] ..................... C09D 11/00; C09B 29/036; B41J 2/01
(52) U.S. Cl. ................... 106/31.48; 106/31.5; 534/755; 534/757; 534/753; 534/775; 534/774
(58) Field of Search .............................. 106/31.48, 31.5; 534/755, 757, 753, 775, 774, 765, 766, 767, 769; 347/100

(56) References Cited

U.S. PATENT DOCUMENTS

| | | | |
|---|---|---|---|
| 2,749,334 A | | 6/1956 | Menzi |
| 3,124,566 A | | 3/1964 | Jung et al. |
| 3,320,232 A | * | 5/1967 | Wegmuller et al. .......... 534/775 |
| 3,471,467 A | * | 10/1969 | Bossard et al. .............. 534/775 |
| 4,083,688 A | | 4/1978 | Ramanathan |
| 4,143,034 A | | 3/1979 | Jefferies et al. |
| 4,169,091 A | | 9/1979 | Kuhne et al. |
| 4,263,204 A | * | 4/1981 | Merlo et al. ................. 534/604 |
| 4,885,272 A | | 12/1989 | Chapman et al. |
| 5,391,720 A | * | 2/1995 | Mikoshiba et al. .......... 534/753 |
| 5,421,872 A | | 6/1995 | Haus et al. |
| 5,519,121 A | * | 5/1996 | Renner et al. ............ 106/31.48 |
| 5,820,661 A | | 10/1998 | Gregory et al. |
| 6,455,679 B1 | * | 9/2002 | Tateishi et al. .............. 534/766 |
| 6,489,452 B1 | * | 12/2002 | Tateishi et al. .............. 534/775 |
| 6,582,502 B2 | | 6/2003 | Fujiwara |
| 6,635,747 B2 | * | 10/2003 | Wight et al. ................. 534/803 |
| 6,682,590 B2 | * | 1/2004 | Omatsu et al. ............. 106/31.5 |
| 6,723,835 B1 | * | 4/2004 | Millard et al. ............... 534/772 |
| 2001/0029869 A1 | | 10/2001 | Fujiwara |
| 2003/0089274 A1 | * | 5/2003 | Nishita et al. ............ 106/31.48 |
| 2003/0183123 A1 | * | 10/2003 | Wald ........................ 106/31.48 |
| 2004/0122219 A1 | * | 6/2004 | Fujiwara et al. ............. 534/769 |

FOREIGN PATENT DOCUMENTS

| | | |
|---|---|---|
| EP | 0 399 458 A1 | 11/1990 |
| EP | 0441255 A2 | 8/1991 |
| EP | 0449650 A2 | 10/1991 |
| GB | 1 477 349 | 6/1977 |
| JP | 6-106862 A | 4/1994 |

OTHER PUBLICATIONS

Ayyangar et al, "Synthesis of Monoazo Disperse Dyes from 5–Amino–3–methyl–1–(3',5'–disubstituted) s–Triazinylpyrazoles and a Study of Their Visible Absorption and Dyeing Properties"; *J. Soc. Dyers & Colourists*, vol. 102, pp. 176–181, May/Jun. 1986.

* cited by examiner

Primary Examiner—Helene Klemanski
(74) Attorney, Agent, or Firm—Burns, Doane, Swecker & Mathis, L.L.P.

(57) ABSTRACT

An ink containing at least one dye represented by formula (1):

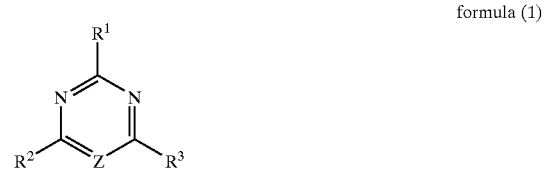

formula (1)

wherein $R^1$, $R^2$ and $R^3$ are each independently a hydrogen atom or a monovalent group; Z is a nitrogen atom, or a carbon atom to which a hydrogen atom or a monovalent group is bonded; and at least one of $R^1$, $R^2$, $R^3$, and the monovalent group that Z has is a substituent having a heterocyclic group substituted with an azo group.

14 Claims, No Drawings

INK, INK JET RECORDING METHOD AND AZO COMPOUND

FIELD OF THE INVENTION

The present invention relates to an azo dye, an ink comprising the dye which is used for image-forming or the like, an ink jet recording method, a thermosensitive recording material, a color toner, and a color filter.

BACKGROUND OF THE INVENTION

In recent years, in particular, materials for forming a color image have been mainly used as an image recording material. Specifically, recording materials of ink jet system, recording materials of heat-sensitive transfer system, recording materials of electrophotographic system, silver halide photosensitive materials of transfer system, printing inks, recording pens, and the like, have been used extensively. Color filters are used in image pick-up elements, such as CCD for photographing equipment, and in displays, such as LCD and PDP, to record and reproduce color images.

In these color image recording materials and color filters, dyes (dyestuffs or pigments) of three primary colors based on a so-called additive color mixing method or subtractive color mixing method are used, to display or record full-color images. A dye, which has absorption characteristics that enable the acquisition of a preferred color reproduction range and has (color)fastness against various conditions for use and environmental conditions, is not available yet, and improvement is strongly desired.

Because of inexpensive material costs, capability of high-speed recording, reduced noise in recording operations, and ease in color recording, ink-jet recording has rapidly come into wide use and is being further developed.

Ink jet recording methods include a continuous method in which droplets are supplied continuously and an on-demand method in which droplets are supplied in response to an image information signal. Ink discharge systems include: 1) one in which droplets are discharged by applying pressure with a piezoelectric element, 2) one in which droplets are discharged by producing air bubbles in ink with heat, 3) one using ultrasonic waves, and 4) one in which droplets are discharged by electrostatic suction. Aqueous ink, oil-based ink, and solid (molten) ink are used as ink-jet-recording ink.

The properties required for a dye that is used in the ink-jet-printing ink are: good solubility or dispersibility in a solvent; capability of high-density recording; good hue; fastness to light, heat, an active gas in environment (e.g. oxidative gases such as ozone, NOx, as well as SOx); excellent fastness to water and chemicals; good fixation and little blur on image-receiving materials; excellent storability as ink; being free from toxicity; high purity; and being available inexpensively. However, it is very difficult to provide a dye that satisfies these requirements on a high level. Particularly, it is strongly desired that a dye should have a good yellow hue, and fastness to light, humidity and heat, and in particular, fastness to an oxidizing gas such as ozone existent in environment when it is printed on an image-receiving material having an ink-receiving layer containing porous white inorganic pigment particles.

Generally, toners containing a colorant dispersed in resin particles are widely used in color copiers and color laser printers of electrophotographic system. The properties required for the color toners include absorption characteristics that enable the acquisition of a preferred color reproduction range, high transmission (transparency) which becomes a problem in particular, when they are used in an over head projector (hereinafter abbreviated to OHP); and (color)fastness against various factors under environmental conditions when using. Toners containing a pigment as a colorant dispersed in particles are disclosed in JP-A-62-157051 ("JP-A" means unexamined published Japanese patent application), JP-A-62-255956 and JP-A-6-118715. Although these toners have excellent light resistance, they easily aggregate since they are insoluble in a solvent, thereby causing problems such as a reduction in transparency and a change in hue of transmitted color. On the other hand, toners containing a dye as a colorant are disclosed in JP-A-3-276161, JP-A-7-209912 and JP-A-8-123085. These toners have rather high transparency and have no change in hue but have a problem with light resistance.

Heat-sensitive transfer recording has advantages, for example, that an apparatus thereof is small in size and can be reduced in production cost, that its operation and maintenance are easy, and that its running cost is low. The properties required for dyes used in thermosensitive transfer recording include absorption characteristics that enable the acquisition of a preferred color reproduction range, compatibility between thermal migration and fixability after transfer, thermal stability, and various types of colorfastness of the obtained image. Conventionally known dyes satisfy not all of these properties. For example, JP-A-60-2398 proposes a heat-sensitive transfer recording material and an image-forming method, which chelate-form a thermally diffusible dye by means of transition metal ions previously added to an image-receiving material, for the purpose of improving fixability and light resistance. However, the formed chelate dye has absorption characteristics at an unsatisfactory level and involves an environmental problem because a transition metal is used.

Since a color filter needs to have high transparency, a method called a dyeing method, in which the color filter is colored with a dye, has been carried out. For instance, a photoresist which can be dyed is subjected to pattern exposure and development to form a pattern, and then the resulting pattern is dyed with a dye of filter color. Subsequently, these steps are repeated for all the colors of the filter, to produce a color filter. Besides the above dyeing method, a color filter can also be produced by a method using a positive-type resist as disclosed in U.S. Pat. No. 4,808,501 and JP-A-6-35182. These methods provide a color filter which has high transmittance due to use of a dye, thereby being excellent in optical characteristics, but which has limitation, for example, to light resistance and heat resistance. Therefore, a dye which has excellent resistance to various factors and high transparency has been desired. Meanwhile, a method of using an organic pigment having excellent light resistance and heat resistance in place of a dye is widely known, but a color filter employing a pigment hardly gives optical properties equivalent to those when employing a dye.

Dyes for use in the above various applications must have the following properties in common. That is, they must have, for example, absorption characteristics preferred from the viewpoint of color reproduction, colorfastness under environmental conditions when they are used, such as light resistance, heat resistance, humidity resistance, resistance to an oxidizing gas such as ozone, and satisfactory fastness against chemicals such as a sulfurous acid gas.

In particular, dyes, which have a good yellow hue and colorfastness against light, moist heat and active gas contained in environment, particularly an oxidizing gas such as ozone, are strongly desired.

The typical skeleton of a yellow dye used in ink jet recording inks is an azo dye skeleton.

Typical examples of the azo dye include an aminopyrazole azo dye and a pyrazolone azo chelate dye disclosed in JP-A-57-5770 and JP-A-58-147470, a pyrazolone azo dye disclosed in JP-A-57-642775, a pyridone azo dye disclosed in JP-A-6-184481, stilbene azo dyes disclosed in JP-A-5-255625 and JP-A-5-331396, and a bisazo dye disclosed in JP-A-57-65757. JP-A-2-24191 discloses a thiadiazole-azopyrazole dye for thermal transfer. Further, in *J. Soc. Dyers & Colourists*, 102, 176–181 (1986), a dye having a triazinyl pyrazole skeleton is described, but its application to ink jet recording inks, heat-sensitive transfer ink sheets, color toners, and color filters is not disclosed therein.

These dyes are discolored or faded by oxidizing gases such as nitrogen oxide gas and ozone, which are often discussed as an environmental issue these days, with the result of a reduction in printing density. There are a large number of dyes that are not always satisfactory in terms of light resistance.

If the application field of the dyes is expanding and the dyes are widely used in exhibits such as advertisements in the future, it will be often exposed to light, heat, humidity and an active gas contained in environment. Therefore, a dye, which exhibits an excellent hue, and high fastness to light, moist heat, and an active gas in environment (e.g. an oxidizing gas such as NOx and ozone as well as SOx, etc.), and an ink composition of the dye, will be more and more strongly desired.

However, it is extremely difficult to find an azo dye and a yellow ink, which satisfy these requirements on a high level.

SUMMARY OF THE INVENTION

The present invention is an ink, which comprises at least one dye represented by formula (1):

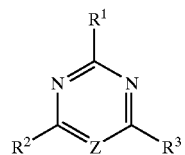

formula (1)

wherein $R^1$, $R^2$ and $R^3$ are each independently a hydrogen atom or a monovalent group; Z is a nitrogen atom, or a carbon atom to which a hydrogen atom or a monovalent group is bonded; and at least one of $R^1$, $R^2$, $R^3$, and the monovalent group that Z has is a substituent having a heterocyclic group substituted with an azo group.

Further, the present invention is an ink-jet-recording method, which comprises the step of: forming an image with the above-described ink, on an image-receiving material having an ink-receiving layer containing white inorganic pigment particles on a support.

Further, the present invention is a compound represented by formula (3):

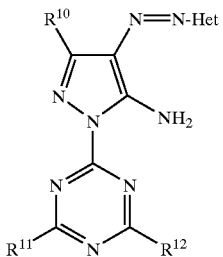

formula (3)

wherein $R^{10}$ is a hydrogen atom, an alkyl group, a cycloalkyl group, an aralkyl group, an alkoxy group or an aryl group; $R^{11}$ is a hydrogen atom, a halogen atom, a hydroxyl group, an alkoxy group, an amino group, a sulfo group or a heterocyclic group; Het is an aromatic heterocyclic group; and $R^{12}$ is a hydrogen atom, a halogen atom, a hydroxyl group, an alkoxy group, an amino group, a sulfo group, a heterocyclic group, or a group represented by formula (3-1):

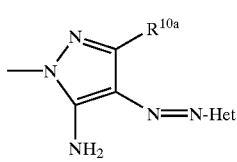

formula (3-1)

wherein, in formula (3-1), $R^{10a}$ is a hydrogen atom, an alkyl group, a cycloalkyl group, an aralkyl group, an alkoxy group or an aryl group; and Het is an aromatic heterocyclic group; and in the formula (3), each group on the compound may have a substituent.

Other and further features and advantages of the invention will appear more fully from the following description.

DETAILED DESCRIPTION OF THE INVENTION

According to the present invention, there are provided the following means:

(1) An ink, comprising at least one dye represented by formula (1):

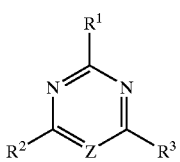

formula (1)

wherein $R^1$, $R^2$ and $R^3$ are each independently a hydrogen atom or a monovalent group; Z is a nitrogen atom, or a carbon atom to which a hydrogen atom or a monovalent group is bonded; and at least one of $R^1$, $R^2$, $R^3$, and the monovalent group that Z has is a substituent having a heterocyclic group substituted with an azo group. (Herein, the substituent having a heterocyclic group substituted with an azo group includes a heterocyclic group itself that is substituted with an azo group.)

(2) The ink according to the above item (1), wherein, in formula (1), one of $R^1$, $R^2$ and $R^3$ represents a substituent having a heterocyclic group substituted with an azo group.

(3) The ink according to the above item (1), wherein, in formula (1), at least two of $R^1$, $R^2$ and $R^3$ each represent a substituent having a heterocyclic group substituted with an azo group.

(4) The ink according to the above item (1), wherein the dye represented by formula (1) is a dye represented by formula (2):

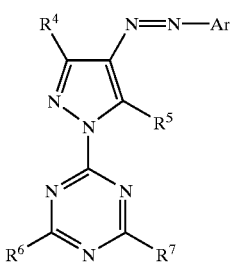

formula (2)

wherein $R^4$ is a monovalent group; $R^5$ is a group —$OR^8$ or a group —$NHR^9$; $R^8$ and $R^9$ are each independently a hydrogen atom or a monovalent group; $R^6$ is a hydrogen atom or a monovalent group; Ar is an aryl group or a heterocyclic group; and $R^7$ is a hydrogen atom, a monovalent group, or a group represented by formula (2-1):

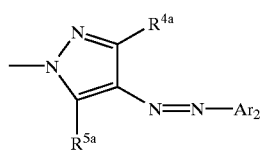

formula (2-1)

wherein, in formula (2-1), $R^{4a}$ is a monovalent group; $R^{5a}$ is a group —$OR^{8a}$ or a group —$NHR^{9a}$; $R^{8a}$ and $R^{9a}$ are each independently a hydrogen atom or a monovalent group; and $Ar_2$ is an aryl group or a heterocyclic group.

(5) The ink according to the above item (4), wherein, in formula (2), $R^7$ is a hydrogen atom or a monovalent group.

(6) The ink according to the above item (4), wherein, in formula (2), $R^7$ is a group represented by the formula (2-1).

(7) The ink according to the above item (1), wherein the dye represented by formula (1) is a dye represented by formula (3):

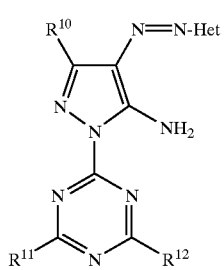

formula (3)

wherein $R^{10}$ is a hydrogen atom, an alkyl group, a cycloalkyl group, an aralkyl group, an alkoxy group or an aryl group; $R^{11}$ is a hydrogen atom, a halogen atom, a hydroxyl group, an alkoxy group, an amino group, a sulfo group or a heterocyclic group; Het is an aromatic heterocyclic group; and $R^{12}$ is a hydrogen atom, a halogen atom, a hydroxyl group, an alkoxy group, an amino group, a sulfo group, a heterocyclic group, or a group represented by formula (3-1):

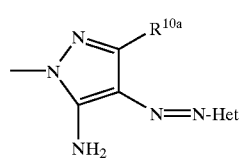

formula (3-1)

wherein, in formula (3-1), $R^{10a}$ is a hydrogen atom, an alkyl group, a cycloalkyl group, an aralkyl group, an alkoxy group or an aryl group; and Het is an aromatic heterocyclic group;

in the formula (3), each group on the dye may have a substituent.

(8) The compound according to the above item (7), wherein, in formula (3), $R^{12}$ is a hydrogen atom, a halogen atom, a hydroxyl group, an alkoxy group, an amino group, a sulfo group or a heterocyclic group.

(9) The compound according to the above item (7), wherein, in formula (3), $R^{12}$ is a group represented by the formula (3-1).

(10) The ink according to any one of the above items (1) to (9), which is an ink for ink jet.

(11) An ink-jet-recording method, comprising the step of: forming an image with the ink of any one of the above items (1) to (10), on an image-receiving material having an ink-receiving layer containing white inorganic pigment particles on a support (base).

(12) An ink sheet, comprising at least one dye represented by the formula (1), (2) or (3) according to any one of the above items (1) to (10).

(13) A color toner, comprising at least one dye represented by the formula (1), (2) or (3) according to any one of the above items (1) to (10).

(14) A color filter, comprising at least one dye represented by the formula (1), (2) or (3) according to any one of the above items (1) to (10).

(15) A compound represented by the formula (3).

(16) The compound according to the above item (15), wherein, in formula (3), $R^{12}$ is a hydrogen atom, a halogen atom, a hydroxyl group, an alkoxy group, an amino group, a sulfo group or a heterocyclic group.

(17) The compound according to the above item (15), wherein, in formula (3), $R^{12}$ is a group represented by the formula (3-1).

(18) A compound represented by formula (4):

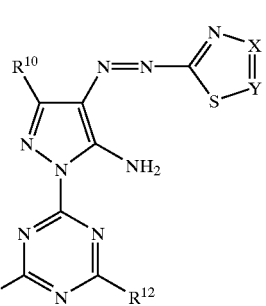

formula (4)

wherein $R^{10}$ is a hydrogen atom, an alkyl group, a cycloalkyl group, an aralkyl group, an alkoxy group or an aryl group; $R^{11}$ is a hydrogen atom, a halogen atom, a hydroxyl group, an alkoxy group, an amino group, a sulfo group or a heterocyclic group; one of X and Y is a nitrogen atom and the other is a —C(—R$^{13}$)= group; R$^{13}$ is a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group; and R$^{12}$ is a hydrogen atom, a halogen atom, a hydroxyl group, an alkoxy group, an amino group, a sulfo group, a heterocyclic group, or a group represented by formula (4-1):

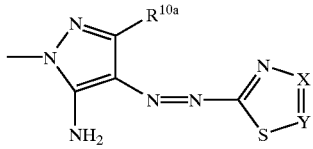

formula (4-1)

wherein, in formula (4-1), R$^{10a}$ is a hydrogen atom, an alkyl group, a cycloalkyl group, an aralkyl group, an alkoxy group or an aryl group; and X and Y have the same meanings as those in formula (4); and in the formula (4), each group on the compound may have a substituent.

(19) The compound according to the above item (18), wherein, in formula (4), R$^{12}$ is a hydrogen atom, a halogen atom, a hydroxyl group, an alkoxy group, an amino group, a sulfo group or a heterocyclic group.

(20) The compound according to the above item (18), wherein, in formula (4), R$^{12}$ is a group represented by the formula (4-1).

The present inventors have keenly studied pyrazolyl azo dye derivatives, for seeking a dye having a good hue and high fastness to light, ozone, and humid and heat. As a result, the inventors have found that the above-mentioned problems in the conventional technique can be solved by using a compound represented by the above formula (1) of a specific dye structure hitherto unknown. Based on this finding, the inventors have completed the present invention.

The present invention will be described in detail hereinbelow.

(Azo Dye)

The azo dye for use in the present invention is represented by the above formula (1). The formula (1) will be described in detail hereinbelow. The monovalent group in the present invention has the same meaning as the substituent that an aryl group has, which is described hereinafter. The heterocyclic group having an azo group has the same meaning as that represented by Ar in formula (2) or Ar$_2$ in formula (2-1), and it is preferably a pyrazole ring.

The azo dye is more preferably an azo dye represented by formula (2). The aryl group represented by Ar or Ar$_2$ has the same meaning as an aryl group described hereinafter. The heterocyclic group represented by Ar or Ar$_2$ is preferably a 5-membered or 6-membered ring and may be condensed to another ring. The heterocyclic group may be an aromatic heterocyclic or non-aromatic heterocyclic group. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. An aromatic heterocyclic group is more preferred.

Similarly to the above, preferred examples of the aromatic heterocyclic group include pyridine, pyrazine, pyrimidine, pyridazine, triazine, pyrazole, imidazole, benzimidazole, triazole, thiazole, benzothiazole, isothiazole, benzisothiazole and thiadiazole. Thiadiazole is the most preferred. Each of these may have a substituent. Examples of the substituent are the same as the substituent on the aryl group to be described later.

The azo dye is more preferably a dye represented by the formula (3).

The formula (3) will be described in detail hereinbelow. The alkyl group represented by R$^{10}$ or R$^{10a}$ includes a substituted or unsubstituted alkyl group. The substituted or unsubstituted alkyl group is preferably an alkyl group having 1 to 30 carbon atoms. Examples of the substituent are the same as the substituent on the aryl group to be described later. Out of these, a hydroxyl group, an alkoxy group, a cyano group, a halogen atom, a sulfo group (which may be in the form of a salt), and a carboxyl group (which may be in the form of a salt) are preferred. Examples of the alkyl group include a methyl group, an ethyl group, a butyl group, a t-butyl group, a n-octyl group, an eicosyl group, a 2-chloroethyl group, a hydroxyethyl group, a cyanoethyl group and a 4-sulfobutyl group.

The cycloalkyl group represented by R$^{10}$ or R$^{10a}$ in formula (3) includes a substituted or unsubstituted cycloalkyl group. The substituted or unsubstituted cycloalkyl group is preferably a cycloalkyl group having 5 to 30 carbon atoms. Examples of the substituent are the same as the substituent of the aryl group to be described later. Examples of the cycloalkyl group include a cyclohexyl group, a cyclopentyl group and a 4-n-dodecylcyclohexyl group.

The aralkyl group represented by R$^{10}$ or R$^{10a}$ in formula (3) includes a substituted or unsubstituted aralkyl group. The substituted or unsubstituted aralkyl group is preferably an aralkyl group having 7 to 30 carbon atoms. Examples of the substituent are the same as the substituent of the aryl group to be described later. Examples of the aralkyl group include a benzyl group and a 2-phenethyl group.

The alkoxy group represented by R$^{10}$ or R$^{10a}$ in formula (3) includes a substituted or unsubstituted alkoxy group. The substituted or unsubstituted alkoxy group is preferably an alkoxy group having 1 to 30 carbon atoms. Examples of the substituent are the same as the substituent of the aryl group to be described later. Examples of the alkoxy group include a methoxy group, an ethoxy group, an isopropoxy group, an n-octyloxy group, a methoxyethoxy group, a hydroxyethoxy group and a 3-carboxypropoxy group.

Examples of the aryl group represented by R$^{10}$ or R$^{10a}$ in formula (3) include a substituted or unsubstituted aryl group. The substituted or unsubstituted aryl group is preferably an aryl group having 6 to 30 carbon atoms. Examples of substituents on the aryl group represented by R$^{10}$ or R$^{10a}$ in formula (3) include a halogen atom, an alkyl group, a cycloalkyl group, an aralkyl group, an alkenyl group, an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoyl amino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group and a silyl group.

The aryl group represented by $R^{10}$ or $R^{10a}$, in particular examples of a substituent thereon, will be described in detail hereinafter.

Examples of the halogen atom include a chlorine atom, a bromine atom and an iodine atom, and the alkyl group, alkoxy group, cycloalkyl group and aralkyl group have the same meanings as defined hereinabove.

The alkenyl group is a linear, branched or cyclic, substituted or unsubstituted alkenyl group. The alkenyl group is preferably a substituted or unsubstituted alkenyl group having 2 to 30 carbon atoms. Examples of the alkenyl group include a vinyl group, an allyl group, a prenyl group, a geranyl group, an oleyl group, a 2-cyclopenten-1-yl group and a 2-cyclohexen-1-yl group.

The alkynyl group is preferably a substituted or unsubstituted alkynyl group having 2 to 30 carbon atoms. Examples of the alkynyl group include an ethynyl group and a propargyl group.

The aryl group is preferably a substituted or unsubstituted aryl group having 6 to 30 carbon atoms. Examples of the aryl group include a phenyl group, a p-tolyl group, a naphthyl group, a m-chlorophenyl group and an o-hexadecanoylaminophenyl group.

The heterocyclic group is preferably a 5-membered or 6-membered, substituted or unsubstituted monovalent group obtained by removing one hydrogen atom from an aromatic or non-aromatic heterocyclic compound, more preferably a 5-membered or 6-membered aromatic heterocyclic group having 3 to 30 carbon atoms. Examples of the heterocyclic group include a 2-furyl group, a 2-thienyl group, a 2-pyrimidinyl group and a 2-benzothiazolyl group.

The aryloxy group is preferably a substituted or unsubstituted aryloxy group having 6 to 30 carbon atoms. Examples of the aryloxy group include a phenoxy group, a 2-methylphenoxy group, a 4-t-buthylphenoxy group, a 3-nitrophenoxy group and a 2-tetradecanoylaminophenoxy group.

The silyloxy group is preferably a silyloxy group having 3 to 20 carbon atoms. Examples of the silyloxy group include a trimethylsilyloxy group and a t-butyldimethylsilyloxy group.

The heterocyclic oxy group is preferably a substituted or unsubstituted heterocyclic oxy group having 2 to 30 carbon atoms. Examples of the heterocyclic oxy group include a 1-phenyltetrazole-5-oxy group and a 2-tetrahydropyranyloxy group.

The acyloxy group is preferably a formyloxy group, a substituted or unsubstituted alkylcarbonyloxy group having 2 to 30 carbon atoms, or a substituted or unsubstituted arylcarbonyloxy group having 6 to 30 carbon atoms. Examples of the acyloxy group include a formyloxy group, an acetyloxy group, a pivaloyloxy group, a stealoyloxy group, a benzoyloxy group and a p-methoxyphenylcarbonyloxy group.

The carbamoyloxy group is preferably a substituted or unsubstituted carbamoyloxy group having 1 to 30 carbon atoms. Examples of the carbamoyloxy group include an N,N-dimethylcarbamoyloxy group, an N,N-diethylcarbamoyloxy group, a morpholinocarbonyloxy group, an N,N-di-n-octylaminocarbonyloxy group and an N-n-octylcarbamoyloxy group.

The alkoxycarbonyloxy group is preferably a substituted or unsubstituted alkoxycarbonyloxy group having 2 to 30 carbon atoms. Examples of the alkoxycarbonyloxy group include a methoxycarbonyloxy group, an ethoxycarbonyloxy group, a t-butoxycarbonyloxy group and a n-octylcarbonyloxy group.

The aryloxycarbonyloxy group is preferably a substituted or unsubstituted aryloxycarbonyloxy group having 7 to 30 carbon atoms. Examples of the aryloxycarbonyloxy group include a phenoxycarbonyloxy group, a p-methoxyphenoxycarbonyloxy group and a p-n-hexadecyloxyphenoxycarbonyloxy group.

The amino group is preferably a substituted or unsubstituted alkylamino group having 1 to 30 carbon atoms, or a substituted or unsubstituted anilino group having 6 to 30 carbon atoms. Examples of the amino group include an amino group, a methylamino group, a dimethylamino group, an anilino group, an N-methyl-anilino group and a diphenylamino group.

The acylamino group is preferably a formylamino group, a substituted or unsubstituted alkylcarbonylamino group having 1 to 30 carbon atoms, or a substituted or unsubstituted arylcarbonylamino group having 6 to 30 carbon atoms. Examples of the acylamino group include a formylamino group, an acetylamino group, a pivaloylamino group, a lauroylamino group, a benzoylamino group and a 3,4,5-tri-n-octyloxyphenylcarbonylamino group.

The aminocarbonylamino group is preferably a substituted or unsubstituted aminocarbonylamino group having 1 to 30 carbon atoms. Examples of the aminocarbonylamino group include a carbamoylamino group, an N,N-dimethylaminocarbonylamino group, an N,N-diethylaminocarbonylamino group and a morpholinocarbonylamino group.

The alkoxycarbonylamino group is preferably a substituted or unsubstituted alkoxycarbonylamino group having 2 to 30 carbon atoms. Examples of the alkoxycarbonylamino group include a methoxycarbonylamino group, an ethoxycarbonylamino group, a t-butoxycarbonylamino group, a n-octadecyloxycarbonylamino group and an N-methyl-methoxycarbonylamino group.

The aryloxycarbonylamino group is preferably a substituted or unsubstituted aryloxycarbonylamino group having 7 to 30 carbon atoms. Examples of the aryloxycarbonylamino group include a phenoxycarbonylamino group, a p-chlorophenoxycarbonylamino group and a m-n-octyloxyphenoxycarbonylamino group.

The sulfamoylamino group is preferably a substituted or unsubstituted sulfamoylamino group having 0 (zero) to 30 carbon atoms. Examples of the sulfamoylamino group include a sulfamoylamino group, an N,N-dimethylaminosulfonylamino group and an N-n-octylaminosulfonylamino group.

The alkyl- or aryl-sulfonylamino group is preferably a substituted or unsubstituted alkyl sulfonylamino group having 1 to 30 carbon atoms, or a substituted or unsubstituted aryl sulfonylamino group having 6 to 30 carbon atoms. Examples of the alkyl- or aryl-sulfonylamino group include a methyl sulfonylamino group, a butylsulfonylamino group, a phenylsulfonylamino group, a 2,3,5-trichlorophenylsulfonylamino group and a p-methylphenylsulfonylamino group.

The alkylthio group is preferably a substituted or unsubstituted alkylthio group having 1 to 30 carbon atoms. Examples of the alkylthio group include a methylthio group, an ethylthio group and a n-hexadecylthio group.

The arylthio group is preferably a substituted or unsubstituted arylthio group having 6 to 30 carbon atoms. Examples of the arylthio group include a phenylthio group, a p-chlorophenylthio group and a m-methoxyphenylthio group.

The heterocyclic thio group is preferably a substituted or unsubstituted heterocyclic thio group having 2 to 30 carbon atoms. Examples of the heterocyclic thio group include a 2-benzothiazolylthio group and a 1-phenyltetrazol-5-yl-thio group.

The sulfamoyl group is preferably a substituted or unsubstituted sulfamoyl group having 0 (zero) to 30 carbon atoms. Examples of the sulfamoyl group include a N-ethylsulfamoyl group, a N-(3-dodecyloxypropyl)sulfamoyl group, a N,N-dimethylsulfamoyl group, a N-acetylsulfamoyl group, a N-benzoylsulfamoyl group and a N-(N'-phenylcarbamoyl)sulfamoyl group.

The alkyl- or aryl-sulfinyl group is preferably a substituted or unsubstituted alkylsulfinyl group having 1 to 30 carbon atoms, or a substituted or unsubstituted arylsulfinyl group having 6 to 30 carbon atoms. Examples of the alkyl- or aryl-sulfinyl group include a methylsulfinyl group, an ethylsulfinyl group, a phenylsulfinyl group and a p-methylphenylsulfinyl group.

The alkyl- or aryl-sulfonyl group is preferably a substituted or unsubstituted alkylsulfonyl group having 1 to 30 carbon atoms, a substituted or unsubstituted arylsulfonyl group having 6 to 30 carbon atoms. Examples of the alkyl- or aryl-sulfonyl group include a methylsulfonyl group, an ethylsulfonyl group, a phenylsulfonyl group and a p-methylphenylsulfonyl group.

The acyl group is preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 4 to 30 carbon atoms in which the carbonyl group is bonded to a carbon atom in the heterocycle moiety. Examples of the acyl group include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

The aryloxycarbonyl group is preferably a substituted or unsubstituted aryloxycarbonyl group having 7 to 30 carbon atoms. Examples of the aryloxycarbonyl group include a phenoxycarbonyl group, an o-chlorophenoxycarbonyl group, a m-nitrophenoxycarbonyl group and a p-t-butylphenoxycarbonyl group.

The alkoxycarbonyl group is preferably a substituted or unsubstituted alkoxycarbonyl group having 2 to 30 carbon atoms. Examples of the alkoxycarbonyl group include a methoxycarbonyl group, an ethoxycarbonyl group, a t-butoxycarbonyl group and a n-octadecyloxycarbonyl group.

The carbamoyl group is preferably a substituted or unsubstituted carbamoyl group having 1 to 30 carbon atoms. Examples of the carbamoyl group include a carbamoyl group, an N-methylcarbamoyl group, an N,N-dimethylcarbamoyl group, an N,N-di-n-octylcarbamoyl group and an N-(methylsulfonyl)carbamoyl group.

The phosphino group is preferably a substituted or unsubstituted phosphino group having 2 to 30 carbon atoms. Examples of the phosphino group include a dimethylphosphino group, a diphenylphosphino group and a methylphenoxyphosphino group.

The phosphinyl group is preferably a substituted or unsubstituted phosphinyl group having 2 to 30 carbon atoms. Examples of the phosphinyl group include a phosphinyl group, a dioctyloxyphosphinyl group and a diethoxyphosphinyl group.

The phosphinyloxy group is preferably a substituted or unsubstituted phosphinyloxy group having 2 to 30 carbon atoms. Examples of the phosphinyloxy group include a diphenoxyphosphinyloxy group and a dioctyloxyphosphinyloxy group.

The phosphinylamino group is preferably a substituted or unsubstituted phosphinylamino group having 2 to 30 carbon atoms. Examples of the phosphinylamino group include a dimethoxyphosphinylamino group and a dimethylaminophosphinylamino group.

The silyl group is preferably a substituted or unsubstituted silyl group having 3 to 30 carbon atoms. Examples of the silyl group include a trimethylsilyl group, a t-butyldimethylsilyl group and a phenyldimethylsilyl group.

Out of the substituents on the aryl group represented by $R^{10}$ or $R^{10a}$ listed above, a substituent having a hydrogen atom may be substituted by any one of the above groups by removing the hydrogen atom. Examples of the substituent include an alkylcarbonylaminosulfonyl group, an arylcarbonylaminosulfonyl group, an alkylsulfonylaminocarbonyl group and an arylsulfonylaminocarbonyl group. Specific examples of the substituent include a methylsulfonylaminocarbonyl group, a p-methylphenylsulfonylaminocarbonyl group, an acetylaminosulfonyl group and a benzoylaminosulfonyl group.

A halogen atom, an alkoxy group and an amino group represented by $R^{11}$ or $R^{12}$ have the same meanings as the above-mentioned substituents on the aryl group. A heterocyclic group represented by $R^{11}$ or $R^{12}$ has the same meaning as the heterocyclic group represented by Ar in formula (2) or $Ar_2$ in formula (2-1).

$R^{10}$ and $R^{10a}$ each are preferably an alkyl group. $R^{11}$ and $R^{12}$ each are preferably an amino group.

Het represents an aromatic heterocyclic group, and similarly in the above its preferred examples include pyridine, pyrazine, pyrimidine, pyridazine, triazine, pyrazole, imidazole, benzimidazole, triazole, thiazole, benzothiazole, isothiazole, benzisothiazole and thiadiazole. Thiadiazole is the most preferred. Each of these may have a substituent, examples of the substituent have the same meanings as the substituent on the aryl group above.

The particularly preferred dye is a compound represented by the formula (4).

One of X and Y is a nitrogen atom, and the other is a —C(—$R^{13}$)= group. Preferably, X is —C(—$R^{13}$)= and Y is a nitrogen atom. A halogen atom, an alkyl group, an alkylthio group, an alkylsulfonyl group, an alkylsulfinyl group, an alkoxycarbonyl group, a carbamoyl group, an alkoxy group, an aryl group, an arylthio group, an arylsulfonyl group, an arylsulfinyl group, an aryloxy group and an acylamino group, each of which is represented by $R^{13}$, have the same meanings as the above-mentioned substituents on the aryl group.

$R^{13}$ is preferably a hydrogen atom, an alkyl group, an alkylthio group or an aryl group.

Illustrative examples (Exemplified Dyes 1 to 61, and 1B to 25B) of the dye represented by the above formula (1), (2), (3) or (4) are given below, but the dye for use in the present invention is not limited to the following examples. In the following specific examples, Me means a methyl group, Et means an ethyl group, and Ph means a phenyl group.

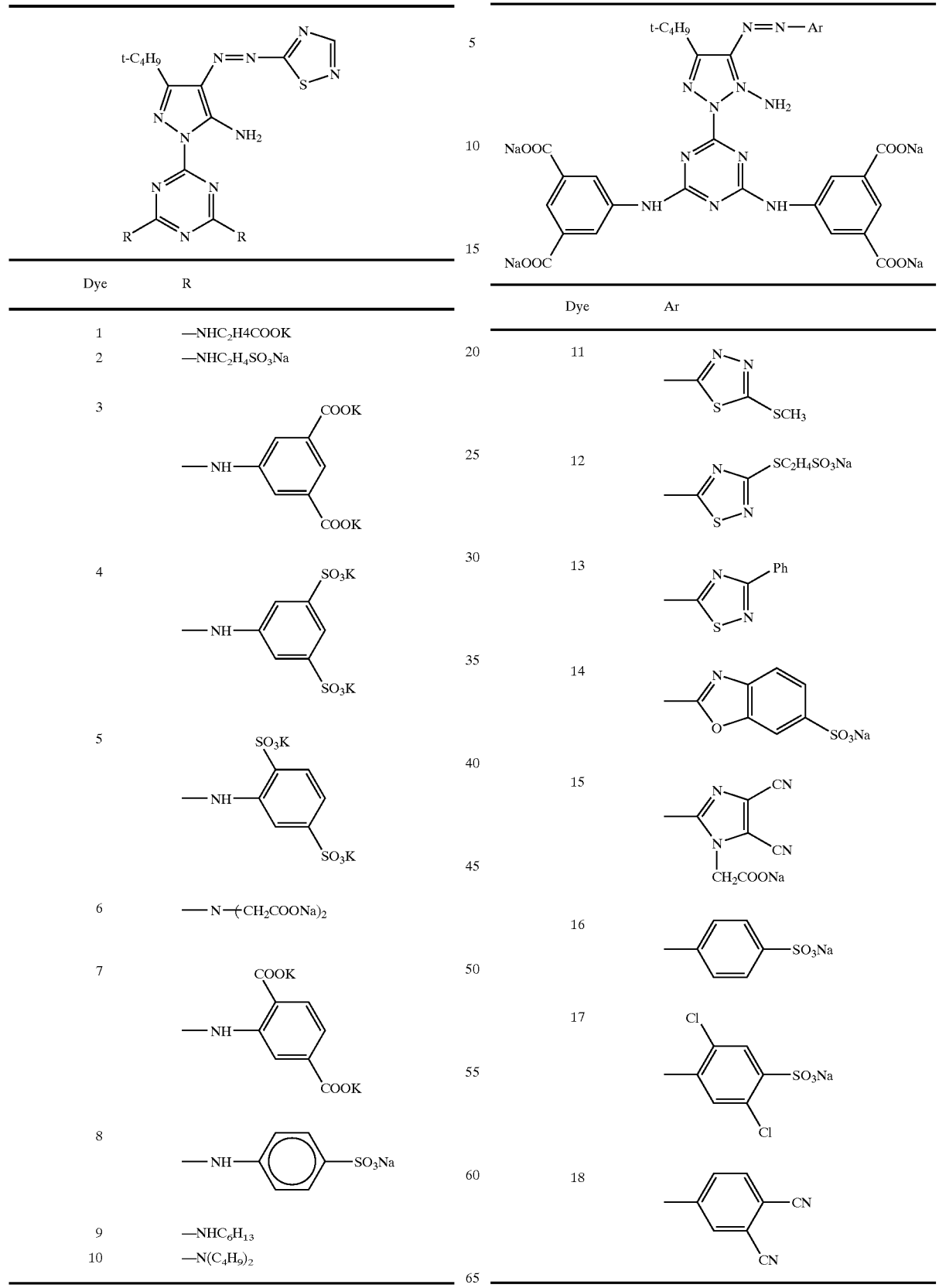

-continued
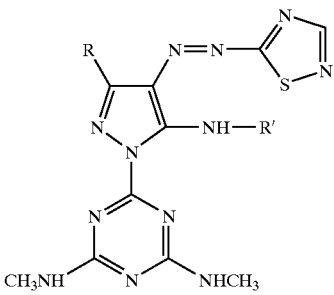
| Dye | R | R' |
|---|---|---|
| 19 | Ph | H |
| 20 | OC₂H₅ | C₂H₅ |
| 21 | CH₃ | H |
| 22 | t-C₄H₉ | H |
| 23 | t-C₄H₉ | —C₂H₄COOH |
Dye 24
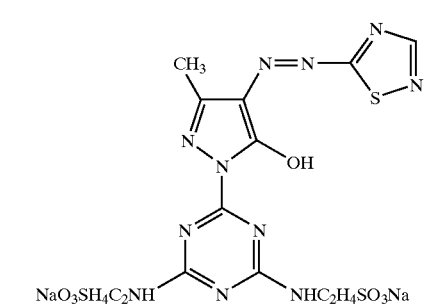
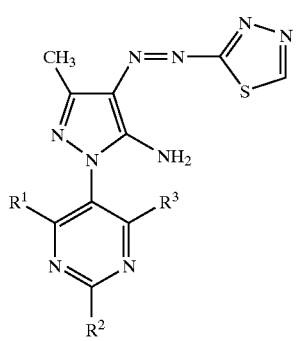
| Dye | R |
|---|---|
| 25 | H |
| 26 | OCH₃ |
| 27 | OH |
| 28 | SO₃Na |
| 29 | F |
| 30 | 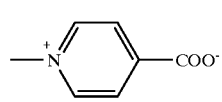 |
-continued
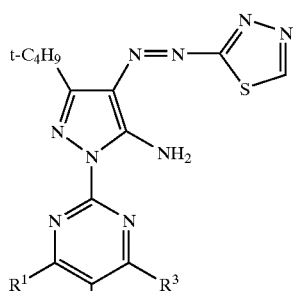
| Dye | R¹ | R² | R³ |
|---|---|---|---|
| 31 | Cl | Cl | Cl |
| 32 | Cl | Cl | F |
| 33 | Cl | —CONHPh | Cl |
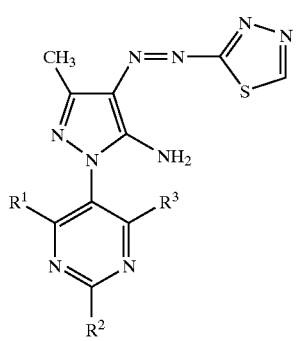
| Dye | R¹ | R² | R³ |
|---|---|---|---|
| 34 | F | H | H |
| 35 | Cl | H | F |
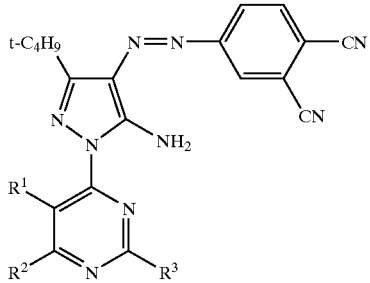
| Dye | R¹ | R² | R³ |
|---|---|---|---|
| 36 | H | F | F |
| 37 | F | F | H |

-continued
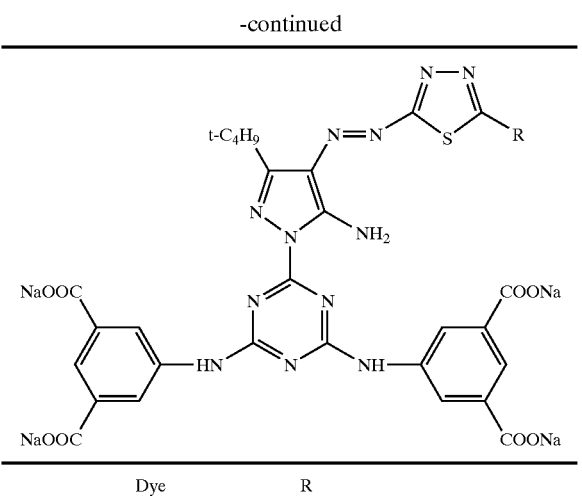
| Dye | R |
|---|---|
| 38 | 3H |
| 39 | CH₃ |
| 40 | Ph |
| 41 | SCH₂COONa |
| 42 | SC₂H₅ |
| 43 | SC₄H₉-n |
| 44 | SCH₂CHMe₂ |
| 45 | SCHMeEt |
| 46 | SC₄H₉-t |
| 47 | SC₇H₁₅-n |
| 48 | SC₂H₄OC₂H₅ |
| 49 | SC₂H₄OC₄H₉-n |
| 50 | SCH₂CF₃ |
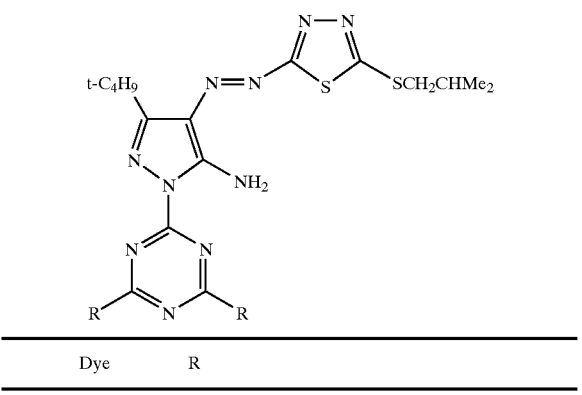
| Dye | R |
|---|---|
| 51 | —NHC₂H₄COOK |
| 52 | —NHC₂H₄SO₃Na |
53
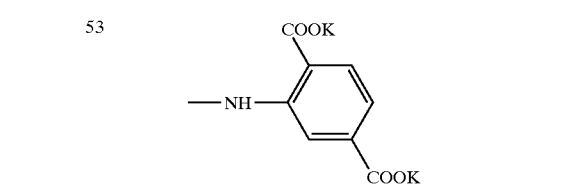
54
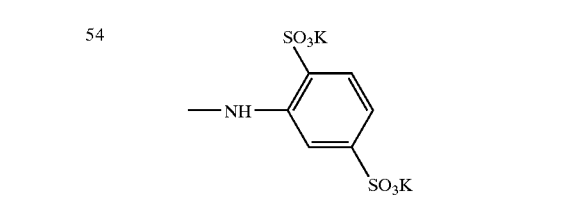
-continued
| 55 | 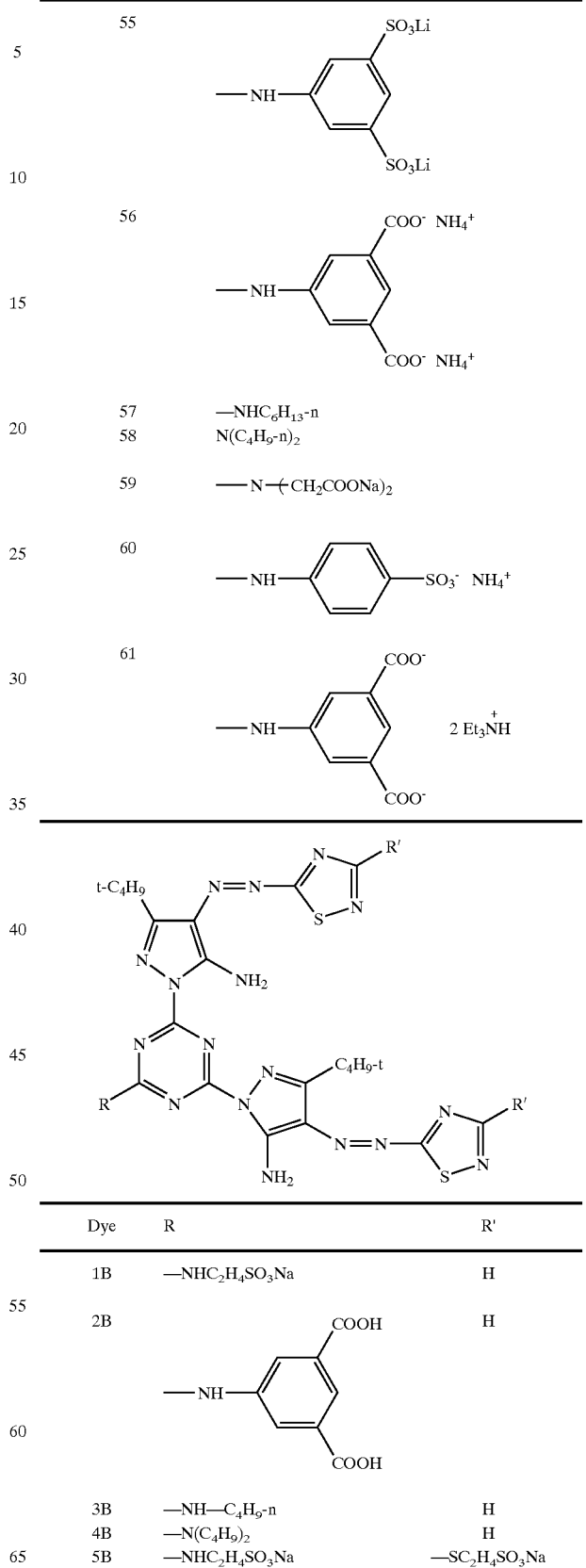 |
|---|---|
| 56 | |
| 57 | —NHC₆H₁₃-n |
| 58 | N(C₄H₉-n)₂ |
| 59 | |
| 60 | |
| 61 | |
| Dye | R | R' |
|---|---|---|
| 1B | —NHC₂H₄SO₃Na | H |
| 2B | | H |
| 3B | —NH—C₄H₉-n | H |
| 4B | —N(C₄H₉)₂ | H |
| 5B | —NHC₂H₄SO₃Na | —SC₂H₄SO₃Na |

-continued

| Dye | | R |
|---|---|---|
| 6B | [structure: —NH— attached to benzene with SO₃Na (two positions)] | H |
| 7B | [structure: —NH— attached to benzene with COOK (two positions)] | Ph |

[Structure: bis-pyrazolyl-triazine with t-C₄H₉, R, N=N—Ar groups; NaO₃SH₄C₂NH substituent]

| Dye | Ar | R |
|---|---|---|
| 8B | [benzene with two SO₃Na and methyl] | —NH₂ |
| 9B | [benzene with two SO₃Na and methyl] | —OH |
| 10B | [thiadiazole with methyl] | —NH₂ |
| 11B | [imidazole with two CN, methyl, CH₂COONa] | —NH₂ |

-continued

[Structure: triazine bearing two pyrazole rings each with R group and azo-thiadiazole-NH₂ substituent; H₁₃C₆NH on triazine]

| Dye | R |
|---|---|
| 12B | —CH₃ |
| 13B | Ph |
| 14B | —OC₂H₅ |

Dye 15B

[Structure: tri-pyrazolyl-triazine with t-C₄H₉ groups, azo-thiadiazole-NH₂ substituents]

[Structure: triazine with pyrazole-azo-thiadiazole-R groups, t-C₄H₉, C₄H₉-t, NaO₃SH₄C₂NH]

| Dye | R |
|---|---|
| 16B | —SCH₂COOCH3 |
| 17B | —SCH₂COONa |
| 18B | —SCH₂CH(CH₃)₂ |
| 19B | Ph |
| 20B | —SCH₃ |
| 21B | —CH₃ |

-continued
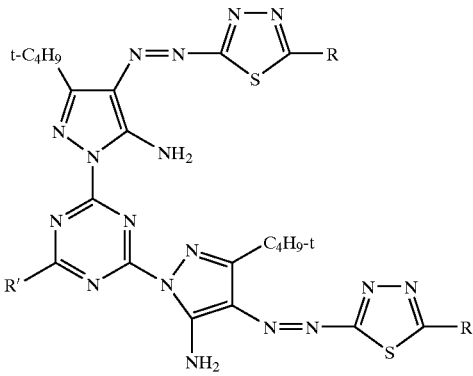
| Dye | R | R' |
|---|---|---|
| 22B | —SCH$_2$COONa | 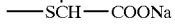 |
| 23B | 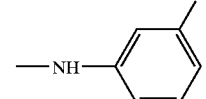 | 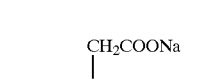 |
| 24B |  | 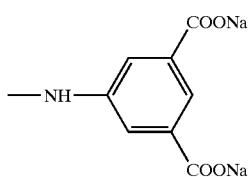 |
| 25B | —SCH$_2$COOK | —N(CH$_2$COOK)$_2$ |
The dye of the present invention can be synthesized by the following method. As typical examples, the method of synthesizing Dye 2 and Dye 5B will be described in detail.
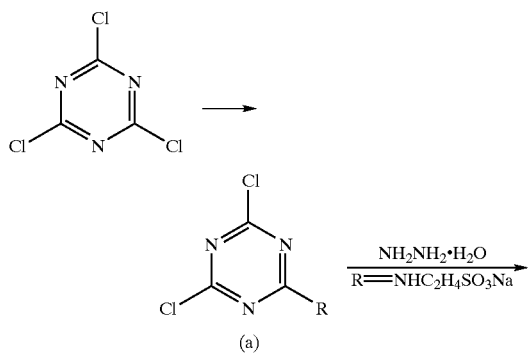
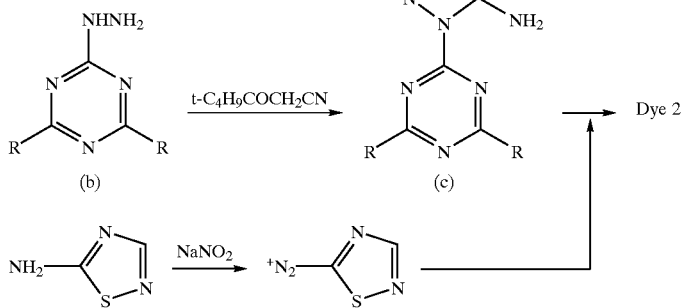

Synthetic Example 1

10 g of cyanuric chloride was dissolved in 150 ml of acetone, and was added thereto 160 ml of an aqueous solution containing 13.6 g of taurine and 11.5 g of sodium carbonate at 15° C. or less under cooling with ice, and the resulting mixture was stirred at room temperature for 8 hours. 200 ml of acetone was added thereto, and the precipitated crystals were separated by filtration, to obtain 22 g of (a).

8.1 g of (a) was dissolved in 25 ml of water, 2 g of hydrazine was added thereto, and the resulting solution was heated at 70° C. for 2 hours and then concentrated. The precipitated crystals were separated by filtration, to obtain 5.7 g of (b).

A solution of 5.7 g of (b), 1.8 g of pivaloylacetonitrile, 3.6 g of sodium hydrogencarbonate, 30 ml of water and 30 ml of ethanol was heated for 2 hours, and after adding 8 ml of hydrochloric acid thereto, the resulting mixture was further heated for 2 hours. After concentration, the precipitated crystals were separated by filtration, to obtain 5.7 g of (c).

A mixed solution of 3.4 g of (c), 20 ml of methanol, 13 ml of acetic acid and 5.5 g of sodium acetate was cooled to 10° C. or less. Separately, using 0.81 g of 5-amino-2,4-thiadiazole, a diazo solution was prepared and added to the above mixed solution at 10° C. or less, and the resulting mixture was stirred at room temperature for 2 hours. After the precipitated crystals were separated by filtration, 1 g of Dye 2 was obtained by column chromatography using Sephadex (trade name).

$\lambda$max 441.9 nm ($H_2O$), $\epsilon$: $2.15 \times 10^4$ ($dm^3$/mol cm)

Synthetic Example 2

10 g of cyanuric chloride was dissolved in 150 ml of acetone, and was added thereto 160 ml of an aqueous solution containing 6.8 g of taurine and 6 g of sodium carbonate at 25° C. or less under cooling with ice, and the resulting mixture was stirred at room temperature for 8 hours and then concentrated, to obtain (a1). 20 g of hydrazine was added thereto at room temperature, and the resulting mixture was stirred at 70° C. for 3 hours. After concentration, methanol was added thereto, and the precipitated crystals were separated by filtration, to obtain 11.3 g of (b1).

A solution of 11 g of (b1), 9.6 g of pivaloylacetonitrile, 19.2 g of sodium hydrogencarbonate, 60 ml of water and 60 ml of ethanol was heated for 2 hours, and after adding 22 ml of hydrochloric acid thereto, the resulting mixture was further heated for 2 hours. After concentration, the precipitated crystals were separated by filtration, to obtain 9.3 g of (c1).

A mixed solution of 1.2 g of (c1), 7 ml of methanol, 4.8 ml of acetic acid and 4.2 g of sodium acetate was cooled to 10° C. or less. Separately, using 1.45 g of 5-amino-3-sulfoethylthio-2,4-thiadiazole, a diazo solution was prepared and added to the above mixed solution at 10° C. or less, and the resulting mixture was stirred at room temperature for 2 hours. After the precipitated crystals were separated by filtration, 1.2 g of Dye 5B was obtained by column chromatography using Sephadex.

$\lambda$max 444.5 nm ($H_2O$), $\epsilon$: $3.65 \times 10^4$ ($dm^3$/mol cm)

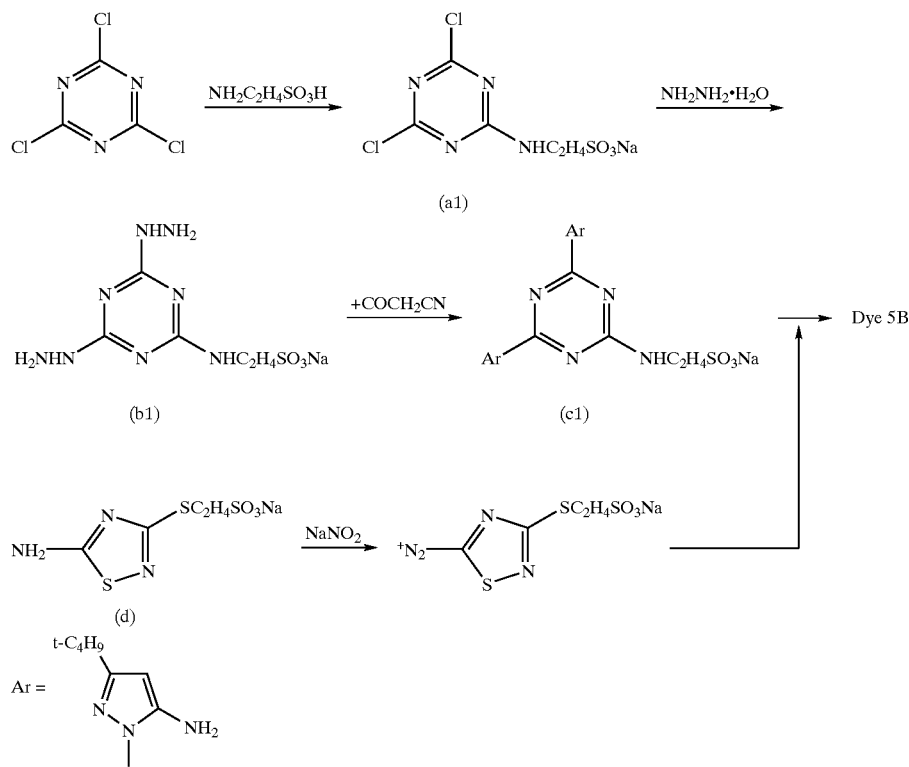

Other dyes can be synthesized in the similar manner. The maximum absorption wavelength λmax of typical dyes is shown in Table 1.

TABLE 1

| Dye No. | |
|---|---|
| | λmax (H$_2$O) |
| 1 | 442 nm |
| 2 | 442 nm |
| 3 | 444 nm |
| 4 | 443 nm |
| 5 | 433 nm |
| 8 | 443 nm |
| 11 | 443 nm |
| 25 | 444 nm |
| 38 | 428 nm |
| 40 | 440 nm |
| 41 | 445 nm |
| 42 | 445 nm |
| 43 | 444 nm |
| 44 | 445 nm |
| 45 | 445 nm |
| 47 | 443 nm |
| 48 | 444 nm |
| 49 | 445 nm |
| 50 | 443 nm |
| | λmax/solvent |
| 1B | 440 nm/MeOH |
| 2B | 441 nm/MeOH |
| 3B | 442 nm/MeOH |
| 4B | 443 nm/MeOH |
| 5B | 445 nm/H$_2$O |
| 6B | 442 nm/H$_2$O |
| 7B | 441 nm/MeOH |
| 16B | 449.0 nm/MeOH |
| 17B | 437.2 nm/H$_2$O |
| 18B | 445.0 nm/MeOH |
| 19B | 441.5 nm/MeOH |
| 20B | 445.0 nm/MeOH |
| 21B | 421.8 nm/MeOH |

Note:
"Me" represents a methyl group.

As use of the dye of the present invention, can be mentioned image-recording materials for forming an image, particularly a color image. Specifically, the use include, in addition to ink-jet-system recording materials to be described in detail hereinafter, heat-sensitive recording materials, pressure-sensitive recording materials, recording materials using electrophotographic system, transfer silver halide photosensitive materials, printing inks, recording pens and the like. The use is preferably in ink-jet-system recording materials, heat-sensitive recording materials, and recording materials using electrophotographic system, more preferably in ink-jet recording materials.

The dye may also be used in color filters for recording and reproducing a color image, which are used in solid image pick-up elements such as CCD and displays such as LCD and PDP, and in dye solutions for dyeing various fibers.

The dye of the present invention is used after its physical properties such as solubility, dispersibility and thermal mobility are adjusted by a substituent so as to be suitable for its application purpose. The dye of the present invention can be used in a dissolved state, an emulsified and dispersed state, or a solid dispersed state, according to a system to be used.

(Ink)

The ink of the present invention means an ink comprising at least one kind of the dye of the present invention. The ink of the present invention may contain a medium. When a solvent is used as the medium, the obtained ink is particularly preferable as an ink-jet-recording ink. The ink of the present invention can be prepared by dissolving and/or dispersing the dye of the present invention, in a lipophilic medium or aqueous medium as the medium. An aqueous medium is preferably used. The ink of the present invention includes an ink composition not containing any medium. Other additives may be contained if necessary, within a range not impairing the effect of the present invention. Such other additives include, for example, known additives such as a drying inhibitor (wetting agent), a fade-inhibitor, an emulsion stabilizer, a permeation accelerator, an ultraviolet absorber, an antiseptic, a mildewproofing agent, a pH adjuster, a surface-tension modifier, an antifoaming agent, a viscosity modifier, a dispersing agent, a dispersion stabilizer, a rust preventive, and a chelating agent. These various additives are directly added to an ink solution in the case of an aqueous ink. When an oil-soluble dye is used as a dispersion, these additives are generally added to the dispersion after preparation of the dispersion of the dye, but these additives may also be added to an oil phase or water phase during the preparation.

The above drying inhibitor is preferably used to prevent an ink jet nozzle used in ink jet recording system from being clogged with the dried ink jet recording ink.

The above drying inhibitor is preferably a water-soluble organic solvent having a lower vapor pressure than water. Specific examples of the drying inhibitor include: polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of a polyhydric alcohol, such as ethylene glycol monomethyl (or ethyl) ether, diethylene glycol monomethyl (or ethyl) ether, and triethylene glycol monoethyl (or butyl) ether; heterocyclic compounds, such as 2-pyrrolidone, N-methyl-2-pyrrolidone, 1,3-dimethyl-2-imidazolidinone, and N-ethylmorpholine; sulfur-containing compounds, such as sulfolane, dimethyl sulfoxide, and 3-sulfolene; polyfunctional compounds, such as diacetone alcohol, and diethanolamine; and urea derivatives. Out of these, polyhydric alcohols such as glycerin and diethylene glycol are preferred. The above drying inhibitors may be used singly or in combination of two or more of these. The drying inhibitor is preferably contained in the ink in an amount of 10 to 50 mass %.

The above permeation accelerator is preferably used for the purpose of improving permeation of the ink-jet ink into paper. As the above permeation accelerator, use can be made of an alcohol, such as ethanol, isopropanol, butanol, di(tri) ethylene glycol monobutyl ether or 1,2-hexanediol, or a nonionic surfactant, such as sodium laurylsulfate or sodium oleate. In general, the permeation accelerator exhibits a satisfactory effect when it is contained in the ink in an amount of 5 to 30 mass %. The permeation accelerator is preferably used within the range of an amount to be added that does not cause print through or bleeding (blurring) of printed ink or print.

The above ultraviolet absorber is used to improve the storability of an image. Examples of the ultraviolet absorber that can be used include benzotriazole-based compounds disclosed in JP-A-58-185677, JP-A-61-190537, JP-A-2-782, JP-A-5-197075 and JP-A-9-34057, benzophenone-based compounds disclosed in JP-A-46-2784, JP-A-5-194483 and U.S. Pat. No. 3,214,463, cinnamic acid-based compounds disclosed in JP-B-48-30492 ("JP-B" means examined Japanese patent publication), JP-B-56-21141 and JP-A-10-88106, triazine-based compounds disclosed in JP-A-4-298503, JP-A-8-53427, JP-A-8-239368, JP-A-10-182621 and JP-T-8-501291 ("JP-T" means searched and published International patent application), compounds disclosed in Research Disclosure No. 24239, and compounds which emit fluorescent light by absorbing ultraviolet radiation, namely so-called fluorescent brighteners typified by stilbene-based or benzoxazole-based compounds.

The above fade-inhibitor is used to improve the storability of an image. As the above fade-inhibitor, use can be made of various kinds of organic or metal complex-based fade-inhibitors. Examples of organic fade-inhibitors include hydroquinones, alkoxyphenols, dialkoxyphenols, phenols, anilines, amines, indanes, chromans, alkoxyanilines, and heterocyclic compounds. Examples of such a metal complex include nickel complexes and zinc complexes. Specific examples of the fade-inhibitor that can be used include compounds disclosed in patents cited in paragraphs I to J of Chapter VII of Research Disclosure No. 17643, Research Disclosure No. 15162, left column in page 650 of Research Disclosure No. 18716, page 527 of Research Disclosure No. 36544, page 872 of Research Disclosure No. 307105, and Research Disclosure No. 15162; and compounds included in the formulas of typical compounds and compound examples disclosed in pages 127 to 137 of JP-A-62-215272.

Examples of the mildewproofing agent include sodium dihydroacetate, sodium benzoate, sodium pyridinethion-1-oxide, p-hydroxybenzoic acid ethyl ester, 1,2-benzisothiazolin-3-one, and salts thereof. The mildewproofing agent is preferably used in the ink in an amount of 0.02 to 1.00 mass %. As for the details of these agents, refer can be made, for example, to "Bohkin Bohkabizai Jiten" (Encyclopedia of Antifungal Agents and Mildewproofing Agents) (edited by the encyclopedia editing committee of the Japan Antifungal and Mildewproofing Agent Association).

Examples of the above rust preventive include acidic sulfurous acid salts, sodium thiosulfate, ammonium thioglycolate, diisopropyl ammonium nitrite, pentaerythritol tetranitrate, dicyclohexyl ammonium nitrite and benzotriazole. The rust preventive is preferably used in the ink in an amount of 0.02 to 5.00 mass %.

As the above pH adjuster, use can be made of the above neutralizer (organic base, inorganic alkali). The above pH adjuster is preferably added to ensure that the pH of the ink-jet ink become preferably 6 to 10, more preferably 7 to 10, for the purpose of improving the shelf stability of the ink-jet ink.

As the above surface-tension modifier, mention can be made of a nonionic, cationic or anionic surfactant. The surface tension of the ink-jet ink of the present invention is preferably 20 to 60 mN/m, more preferably 25 to 45 mN/m. The viscosity of the ink-jet ink of the present invention is preferably 30 mpa·s or less, more preferably 20 mPa·s or less. Examples of the surfactant include: anionic surfactants, such as fatty acid salts, alkyl sulfuric acid ester salts, alkyl benzene sulfonic acid salts, alkyl naphthalene sulfonic acid salts, dialkyl sulfosuccinic acid salts, alkyl phosphoric acid ester salts, naphthalene sulfonic acid formalin condensates, and polyoxyethylene alkyl sulfuric acid ester salts; and nonionic surfactants, such as polyoxyethylene alkyl ethers, polyoxyethylene alkylallyl ethers, polyoxyethylene fatty acid esters, sorbitan fatty acid esters, polyxoyethylene sorbitan fatty acid esters, polyoxyethylene alkylamines, glycerin fatty acid esters, and oxyethylene oxypropylene block copolymers. SURFYNOLS (trade name, manufactured by Air Products & Chemicals, Inc.) which is an acetylene-based polyoxyethyleneoxide surfactant can also be preferably used.

An amine oxide-type amphoteric surfactant, such as N,N-dimethyl-N-alkylamine oxide, is also preferred. Further, surfactants enumerated in pages (37) to (38) of JP-A-59-157,636, and Research Disclosure No. 308119 (1989) may also be used.

As the above antifoaming agent, use can be made, if necessary, of a fluorine-containing or silicone-based compound, or a chelating agent typified by EDTA.

In order to disperse the compound of the present invention in an aqueous medium, it is preferred that coloring fine-particles containing the dye and an oil-soluble polymer be dispersed in an aqueous medium, as disclosed in JP-A-11-286637, and Japanese Patent Application Nos. 2000-78491, 2000-80259 and 2000-62370; or that the dye of the present invention which is dissolved in a high-boiling organic solvent be dispersed in an aqueous medium, as disclosed in Japanese Patent Application Nos. 2000-78454, 2000-78491, 2000-203856 and 2000-203857. As for the specific method of dispersing the dye of the present invention in an aqueous medium, and the oil-soluble polymer, high-boiling organic solvent and additives to be used in the methods, and the amounts to be used thereof, those disclosed by the above patents are preferably adopted. Alternatively, the above azo dye in the solid state may be directly dispersed in the form of fine particles. At the time of dispersing, a dispersing agent or a surfactant may be used. Examples of the dispersing apparatus that can be used include a simple stirrer or impeller, an in-line mixer, a mill (e.g., a colloid mill, a ball mill, a sand mill, an attritor, a roller mill, or an agitator mill), an ultrasonic disperser, and a high-pressure emulsifying disperser (high-pressure homogenizer: gorille homogenizer, micro-fluidizer, DeBEE 2000, etc. as commercially available apparatuses). In addition to the above patent publications, the details of the methods of preparing the ink-jet recording ink are described in JP-A-5-148436, JP-A-5-295312, JP-A-7-97541, JP-A-7-82515, JP-A-7-118584, JP-A-11-286637, and Japanese Patent Application No. 2000-87539. These methods can also be utilized in the preparation of the ink-jet-recording ink of the present invention.

The aqueous medium described above can be a mixture composed of water as a main component and a water-miscible organic solvent as an optional component. Examples of the water-miscible organic solvent include alcohols (e.g., methanol, ethanol, propanol, isopropanol, butanol, isobutanol, sec-butanol, t-butanol, pentanol, hexanol, cyclohexanol and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). These water-miscible organic solvents may be used in combination of two or more of these.

It is preferable that the compound of the present invention in an amount of 0.2 parts by mass or more and 10 parts by mass or less is contained, in 100 parts by mass of the ink of the present invention. The ink of the present invention may contain another dye together with the compound of the present invention. In the case where two kinds or more of dyes are used in combination, it is preferable that the total content of the dye compounds falls within the above-described range.

The ink of the present invention can be used not only for the formation of a single-color image but also for the formation of a full-color image. For the formation of a full-color image, a magenta-color tone ink, a cyan-color tone ink, and a yellow-color tone ink can be used. In addition, for the adjustment of colors, a black-color tone ink may also be used.

Further, the ink of the present invention may contain a yellow dye besides the dye of the present invention. Any yellow dye may be used. Examples of the yellow dye include: aryl or heterylazo dyes having, for example, any of phenols, naphthols, anilines, heterocyclic compounds such as pyrazolone or pyridone, or open-chain active methylene compounds, as a coupling component (to be referred to as "coupler component" hereinafter); azomethine dyes having, for example, an open-chain active methylene compound as a coupler component; methine dyes, such as benzylidene dyes and monomethine oxonol dyes; quinone-based dyes, such as naphthoquinone dyes and anthraquinone dyes; and other dyes, including quinophthalone dyes, nitro/nitroso dyes, acridine dyes and acridinone dyes.

Any magenta dye may be used. Examples of the magenta dye include: aryl or heterylazo dyes having, for examples, any of phenols, naphthols or anilines, as a coupler component; azomethine dyes having, for example, any of pyrazolones or pyrazolotriazoles, as a coupler component; methine dyes, such as arylidene dyes, styryl dyes, merocyanine dyes, cyanine dyes or oxonol dyes; carbonium dyes, such as diphenylmethane dyes, triphenylmethane dyes and xanthene dyes; quinone dyes, such as naphthoquinone, anthraquinone and anthrapyridone; and condensation polycyclic dyes, such as dioxazine dyes.

Any cyan dye may be used. Examples of the cyan dye include: aryl or heterylazo dyes having, for example, any of phenols, naphthols or anilines, as a coupler component; azomethine dyes having, for example, any of phenols, naphthols or heterocyclic compounds such as pyrrolotriazole, as a coupler component; polymethine dyes, such as cyanine dyes, oxonol dyes and merocyanine dyes; carbonium dyes, such as diphenylmethane dyes, triphenylmethane dyes and xanthene dyes; phthalocyanine dyes; anthraquinone dyes; and indigo/thioindigo dyes.

The above dyes may assume a yellow, magenta or cyan color only after a part of a chromophore therein is dissociated. In this case, the counter cation may be an inorganic cation such as alkali metal or ammonium, an organic cation such as pyridinium or a quaternary ammonium salt, or a polymer cation having any one of these in its partial structure.

Examples of the black dye that can be used include disazo dyes, trisazo dyes, tetraazo dyes, and carbon black dispersion.

(Ink-Jet-Recording Method)

The ink-jet recording method of the present invention comprises applying an energy to the ink, to form an image on a known image-receiving material. Examples of the image-receiving material include plain paper, resin-coated paper; paper exclusively for ink-jet recording described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947; films, paper for both electrophotography and ink-jet recording, fabrics, glass, metals, and ceramics.

A polymer latex compound may be additionally used, to provide surface gloss or water resistance or improve weatherability, when an image is formed. The time for adding a latex compound to an image receiving material may be before or after the addition of a colorant or simultaneous with the addition of a colorant. Therefore, the site for adding the latex compound may be in image receiving paper or ink. Alternatively, the polymer latex compound may be used alone as a liquid. Specifically, methods disclosed in Japanese Patent Application Nos. 2000-363090, 2000-315231, 2000-354380, 2000-343944, 2000-268952, 2000-299465 and 20000-297365, can be preferably used.

The recording paper and recording films, which are to be used for ink-jet printing using the ink of the present invention, are described below. The supports for use in the recording paper and recording films may be those produced by such an apparatus as a long-screen paper machine and a circular-screen paper machine, and from pulps such as chemical pulps, e.g., LBKP and NBKP, mechanical pulps, e.g., GP, PGW, RMP, TMP, CTMP, CMP, and CGP, waste paper pulp, e.g., DIP, and, if necessary, additives such as conventionally known pigments, binders, sizing agents, fixing agents, cationic agents, and fortifiers for paper strength may be contained. Besides these materials, the support may be a synthetic paper or a plastic film sheet. The thickness of the support is preferably 10 to 250 $\mu$m, and the weight is preferably 10 to 250 g/m$^2$. An ink-receiving layer and a back coat layer may be formed directly on the support. Alternatively, an ink-receiving layer and a back coat layer may be provided after a size press or anchor coat layer, which is made from starch, polyvinyl alcohol, or the like, is provided on the support. The support may be flattened by means of a calender such as a machine calender, a TG calender, or a soft calender. The support that is preferably used in the present invention is a plastic film or a paper whose both surfaces are laminated with a polyolefin (e.g., polyethylene, polystyrene, polyethylene terephthalate, polybutene, or a copolymer thereof). It is preferable that the polyolefin contains a white pigment (e.g., titanium oxide, zinc oxide) or a dye for giving tinge (e.g., cobalt blue, ultramarine blue, neodymium oxide).

The ink-receiving layer provided on the support generally contains a pigment and an aqueous binder. The pigment is preferably a white pigment. Examples of the white pigment include white inorganic pigments, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments, such as a styrene-based pigment, an acryl-based pigment, a urea resin, and a melamine resin. The white pigment to be incorporated in the ink-receiving layer is preferably a porous inorganic pigment. Synthetic amorphous silica or the like having a high proportion of porous area is particularly preferable. The synthetic amorphous silica that can be used may be silicic acid anhydride produced by a dry process or hydrous silicic acid produced by a wet process. The use of hydrous silicic acid is particularly preferable.

Examples of the aqueous binder to be incorporated in the ink-receiving layer include water-soluble polymers, such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide, and derivatives of polyalkylene oxide; and water-dispersible polymers, such as a styrene/butadiene latex and an acrylic emulsion. These aqueous binders may be used singly or in combination of two or more. Among these aqueous binders, polyvinyl alcohol and silanol-modified polyvinyl alcohol are preferably used in the present invention, from the standpoint of adhesion to the pigment and peel resistance of the ink-receiving layer.

In addition to the pigment and aqueous binder, the ink-receiving layer may contain a mordant, a water-proofing agent, a lightfastness enhancer, a surfactant, and other additives.

It is preferable that the mordant to be incorporated in the ink-receiving layer is immobilized. Accordingly, a polymeric mordant is preferably used.

The polymeric mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, and JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The image-receiving materials containing the polymeric mordants described in JP-A-1-161236, pp.212 to 215, are particularly preferable. The use of the polymeric mordant described in this patent publication makes it possible to obtain an image having excellent quality and to improve the lightfastness of the image.

The waterproofing agent is effective in increasing the water resistance of an image. The waterproofing agent is particularly preferably a cationic resin. Examples of the cationic resin include polyamide/polyamine/epichlorohydrin, polyethylene imine, polyamine sulfone, dimethyldiallylammonium chloride polymers, cationic polyacrylamide, and colloidal silica. Among these cationic resins, polyamide/polyamine/epichlorohydrin is particularly preferable. The content of the cationic resin is preferably 1 to 15% by mass, particularly preferably 3 to 10% by mass, to the total solid components of the ink-receiving layer.

Examples of the lightfastness enhancer include zinc sulfate, zinc oxide, hindered amine-based antioxidants, and benzotriazole-based ultraviolet light absorbers such as benzophenone. Among these substances, zinc sulfate is particularly preferable.

The surfactant functions as a coating aid, a peelability-improving agent, a slidability-improving agent, or an antistatic agent.

The surfactants are described in JP-A-62-173463 and JP-A-62-183457. An organofluorine compound may be used in place of the surfactant. Preferably, the organofluorine compound is hydrophobic. Examples of the organofluorine compound include a fluorine-containing surfactant, an oily fluorine-containing compound (e.g., fluorine-based oil), and a solid fluorine-containing compound resin (e.g., tetrafluoroethylene resin). The organofluorine compounds are described in JP-B-57-9053 (columns 8 to 17), and JP-A-61-20994 and JP-A-62-135826. Examples of other additives which may be added to the ink-receiving layer include a pigment dispersant, a thickener, a defoaming agent, a dye, a fluorescent brightener, an antiseptic, a pH controlling agent, a matting agent, a film hardener. The ink-receiving layer may have a single-layer construction or a double-layer construction The recording paper or recording film may have a back coat layer. This layer may contain a white pigment, an aqueous binder, and other components. Examples of the white pigment to be incorporated in the back coat layer include white inorganic pigments, such as light calcium carbonate, heavy calcium carbonate, kaolin, talc, calcium sulfate, barium sulfate, titanium dioxide, zinc oxide, zinc sulfide, zinc carbonate, titanium white, aluminum silicate, diatomaceous earth, calcium silicate, magnesium silicate, synthetic amorphous silica, colloidal silica, colloidal alumina, quasi-boehmite, aluminum hydroxide, alumina, lithopone, zeolite, hydrated halloysite, magnesium carbonate, and magnesium hydroxide; and organic pigments, such as styrene-based plastic pigments, acryl-based plastic pigments, polyethylenes, microcapsules, urea resins, and melamine resins.

Examples of the aqueous binder to be incorporated in the back coat layer include water-soluble polymers, such as a styrene/maleic acid salt copolymer, a styrene/acrylic acid salt copolymer, polyvinyl alcohol, silanol-modified polyvinyl alcohol, starch, cationized starch, casein, gelatin, carboxymethyl cellulose, hydroxyethyl cellulose, and polyvinylpyrrolidone; and water-dispersible polymers, such as a styrene/butadiene latex and an acrylic emulsion. Other components which may be incorporated in the back coat layer include a defoaming agent, a foaming inhibitor, a dye, a fluorescent brightener, an antiseptic, a water-proofing agent.

The layers constituting the ink-jet recording paper or recording film (including a back coat layer) may contain a polymer latex. The polymer latex is used for improvement of film physical properties, such as dimension stabilization, curling prevention, adhesion prevention, and prevention of film cracking. The polymer latices are described in JP-A-62-245258, JP-A-62-131668, and JP-A-62-110066. The incorporation of a polymer latex having a low glass transition temperature (i.e., 40° C. or below) in the layer containing a mordant, can prevent cracking and curling of the layer. The incorporation of a polymer latex having a high glass transition temperature in the back coat layer can also prevent curling of the layer.

The ink-jet recording methods using the ink of the present invention are not particularly limited, and any of known methods can be used. Examples of the method include a charge-controlling method, in which ink is ejected (discharged) by use of electrostatic attraction; a drop-on-demand method (pressure pulse method), in which vibratory pressure of a piezoelectric element is used; an acoustic ink-jet method, in which electric signals are converted into acoustic beams, and the ink is irradiated with the acoustic beams so that the ink is ejected by use of the radiation pressure; and a thermal ink-jet method, in which bubbles are formed by heating the ink, and the pressure thus occurred is used for discharging the ink. Other types of the ink-jet recording method include a method, in which many droplets, each made up of a small volume of a so-called photo-ink having a low concentration, are ejected; a method in which image quality is improved by use of plural kinds of ink each having substantially the same color hue but a different concentration; and a method in which colorless transparent ink is used.

(Color Toner)

Any kinds of binders which are commonly used, may be used as a color toner binder resin for introducing the dye of the present invention. Examples of the binder resin include styrene-based resins, acrylic resins, styrene/acrylic resins and polyester resins. The compound of the present invention is contained in an amount to be generally used, without particular limitation.

Inorganic fine-particles and organic fine-particles may be externally added to the toner, for the purposes of improving fluidity and controlling antistatic properties. Silica fine-particles and titania fine-grains whose surfaces are treated, for example, with a coupling agent containing an alkyl group are preferably used. Preferably, these fine-particles have a number average primary particle diameter of 10 to 500 nm and are contained in the toner in an amount of 0.1 to 20 mass %.

Any release agents which have been conventionally used may be used in the present invention. Specific examples of the release agent include olefins, such as low-molecular-weight polypropylenes, low-molecular-weight polyethylenes, and ethylene/propylene copolymers; microcrystalline wax, carnauba wax, sazol wax, and paraffin wax. The release agent is preferably added to the toner in an amount of 1 to 5 mass %.

The charge-control agent may be added if necessary. It is preferably to use an achromatic charge control agent, from the viewpoint of color-forming property. Examples of the charge control agent include those having a quaternary ammonium salt structure or calyx allene structure.

The carrier to be used may be either an uncoated carrier composed of only magnetic material particles such as iron or ferrite, or a resin-coated carrier obtained by coating the surface of a magnetic material particle with a resin or the like. The average particle diameter of this carrier is preferably 30 to 150 $\mu$m in terms of volume average particle diameter.

The method of forming an image, in which the toner according to the present invention is used, is not particularly limited. Examples of the method include a method in which color images are repeatedly formed on a photosensitive material and then transferred, to form an image; and a method in which images formed on a photosensitive material are transferred to an intermediate transfer material and the like sequentially, and then a color image formed on the intermediate transfer material is transferred to an image-forming member such as paper, to form a color image.

(Heat-sensitive Transfer Material)

The heat-sensitive recording material comprises: an ink sheet prepared by applying the dye of the present invention onto a base, together with a binder; and an image-receiving sheet for fixing the dye transferred corresponding to thermal energy given from a thermal head in response to an image recording signal. The ink sheet can be formed, by dissolving the compound of the present invention in a solvent together with a binder or dispersing the compound in a solvent in the form of fine particles, to prepare an ink solution, and then applying the ink to the base, and optionally drying the resultant base. The compound of the present invention is contained in a commonly used amount, without particular restriction.

As the preferred binder resin, ink solvent, base, and image-receiving sheet, each of which can be used, those disclosed in JP-A-7-137466 can be preferably used.

In order to use the above heat-sensitive recording material as a heat-sensitive recording material capable of recording a full-color image, it is preferred that a cyan ink sheet containing a thermally diffusible cyan dye which can form a cyan image, a magenta ink sheet containing a thermally diffusible magenta dye which can form a magenta image, and a yellow ink sheet containing a thermally diffusible yellow dye which can form a yellow image be formed on a base by applying sequentially. In addition to the above ink sheets, an ink sheet containing a black-image-forming substance may be further formed as required.

(Color Filter)

As the method of forming a color filter, can be mentioned a method in which a pattern is formed with a photoresist, and then dyed; and a method in which a pattern is formed with a photoresist containing a dye, as disclosed in JP-A-4-163552, JP-A-4-128703 and JP-A-4-175753. To introduce the dye of the present invention into a color filter, any one of the above methods may be used. Examples of preferred means includes, as disclosed in JP-A-4-175753 and JP-A-6-35182, a positive resist composition containing a thermosetting resin, a quinonediazido compound, a crosslinking agent, a dye and a solvent; and a method of forming a color filter which comprises: applying the composition onto a base, subjecting the applied base exposure to light through a mask, subjected the exposed portion to development, to form a positive resist pattern, exposing the entire positive resist pattern to light, and curing the exposed positive resist pattern. Further, a color filter of RGB primary colors or Y. M. C. complementary colors can be obtained, by forming a black matrix in accordance in a usual manner.

As for the thermosetting resin, quinonediazido compound, crosslinking agent and solvent to be used, and the amounts to be used thereof, those disclosed in the above patent publications can be preferably used. The compound of the present invention is contained in an amount to be generally used, without particular restriction.

According to the present invention, can be provided:

1) a novel compound, which can be preferably used as a dye, and which has absorption characteristics with excellent color reproduction as a dye for three primary colors, and which has satisfactory colorfastness against light, heat, humidity, and an active gas present in the environment;

2) an ink for ink jet printing, to give a colored image or colored material having excellent hue and colorfastness, an ink sheet for heat-sensitive recording materials, a color toner for electrophotography, a color filter for use in displays such as LCD and PDP and image pick-up elements such as CCD, and various coloring compositions such as a dye solution for dying various fibers;

3) in particular, an ink (e.g. an ink for ink jet recording), and an ink-jet-recording method, which can form an image having a good hue due to use of the above dye and having high fastness under the various service conditions or environmental conditions, for example, against light, humidity and heat, and an active gas present in the environment, particularly an ozone gas; and 4) a novel dye derivative having a specific structure which can be a useful organic compound or intermediate thereof for use in industrial, agricultural, medical or scientific fields.

The present invention will be described in more detail based on the following examples, but the present invention is not limited thereto.

EXAMPLES

Example 1

Deionized water was added to the following components, to make 1 liter in volume. Then, the resulting mixture was stirred for 1 hour under heating at 30 to 40° C. Thereafter, pH of the mixture was adjusted to 9 with 10 mol/l of KOH, and the obtained solution was vacuum filtered with a microfilter having an average opening diameter of 0.25 $\mu$m, to prepare a yellow ink solution.

| (Composition of ink solution A1) | |
|---|---:|
| Yellow dye 2 of this invention | 8.9 g |
| Diethylene glycol | 20 g |
| Glycerin | 120 g |
| Diethylene glycol monobutyl ehter | 230 g |
| 2-Pyrrolidone | 80 g |
| Triethanolamine | 17.9 g |
| Benzotriazole | 0.06 g |
| SURFYNOL TG (trade name, manufactured by Air Products Co.) | 8.5 g |
| PROXEL XL2 (trade name, manufactured by ICI Co., Ltd.) | 1.8 g |

Ink solutions B1, C1, and A2 to C2 were prepared in the same manner as in the preparation of the ink solution A1, except that the dye was changed as shown in the following Table 2.

Separately, ink solutions 101 and 102 were prepared as ink solutions for comparison, using the following dye for comparison A or B, as shown in Table 2, respectively.

When a different dye was used, such a dye was contained in an equimolar amount to be contained, to the ink solution A1.

(Image Recording and Evaluation)

The following evaluations were carried out, with respect to the ink-jet inks of Examples (ink solutions A1 to C1 and A2 to C2) and Comparative Examples (ink solutions 101 and 102). The results are shown in Table 2.

In Table 2, "color tone", "paper dependence", "water resistance", "light resistance" and "ozone gas resistance" were evaluated after an image was recorded on a photo glossy paper ("Gloss" PM photo paper produced by SEIKO EPSON CORPORATION, trade name: KA420PSK, EPSON) with an ink jet printer (manufactured by SEIKO EPSON CORPORATION, trade name: PM-700C), filling a cartridge with any one of the inks for ink jet.

<Color Tone>

The color tone was evaluated with the naked eye based on three grades of "A" (excellent), "B" (good) and "C" (poor). The value λmax of the reflection spectrum of the PM photo paper is also shown.

<Paper Dependence>

The above photo glossy paper or PPC plain paper was printed, setting the printing density of the above printer to "toner saving mode". With respect to color tone, comparison was made between the image formed on the photo glossy paper and the image formed on PPC plain paper. If the difference between the two images was small, it was graded as "A" (good), whereas, if the difference between the two images was large, it was graded as "B" (poor). In this way, the difference was evaluated according to the two grades.

<Water Resistance>

After the image was formed on the photo glossy paper, the paper was dried for one hour at room temperature. After that, the paper was immersed in deionized water for 10 seconds and thereafter left to dry naturally at room temperature. The blur on the paper was inspected. The blur was expressed by the following three ratings: "A", less blur; "B", intermediate extent of blur; and "C", significant blur.

<Light Resistance>

The photo glossy paper having an image formed thereon was irradiated with xenon light (85,000 lx) by means of a weather-o-meter (Atlas C. I65, trade name, manufactured by Atlas) for 7 days. Before and after the xenon irradiation, the image densities were measured using a reflection densitometer (X-Rite 310TR, trade name, manufactured by X-Rite) and the values obtained were used for the calculation of the dye retention (or retained) rate [(image density after xenon irradiation)/(image density before xenon irradiation)× 100%]. The measurement was made at three points of reflection densities, i.e., 1, 1.5, and 2.0 in terms of the image density before the irradiation.

The dye retention rate was expressed by the following three ratings: "A" indicates that the dye retention rate was 70% or more at all of the densities; "B" indicates that the dye retention rate was less than 70% at one or two of the densities; and "C" indicates that the dye retention rate was less than 70% at all of the densities.

<Ozone Resistance>

The photo glossy paper having an image formed thereon was placed in a box provided in dark location, at room temperatre, in which the ozone gas concentration was set to 0.5±0.1 ppm, for 7 days. Before and after the exposure to the ozone gas, the image densities were measured using a reflection densitometer (X-Rite 310TR), and the ozone gas resistance was evaluated based on the dye retention rate [(image density after exposure to ozone)/(image density before exposure to ozone)×100%]. The measurement was made at three points of reflection densities, i.e., 1, 1.5, and 2.0 in terms of the image density before the exposure to ozone. The ozone gas concentration inside the box was set by means of an ozone gas monitor (Model: OZG-EM-01) manufactured by APPLICS.

The ozone gas resistance was expressed by the following three ratings: "A" indicates that the dye retention rate was 70% or more at all of the densities; "B" indicates that the dye retention rate was less than 70% at one or two of the densities; and "C" indicates that the dye retention rate was less than 70% at all of the densities.

TABLE 2

| Sample No. | Dye | Color tone (λmax) | Paper dependence | Water resistance | Light resistance | Ozone resistance |
|---|---|---|---|---|---|---|
| A1 | 2 | A (452 nm) | A | A | A | A |
| B1 | 3 | A (455 nm) | A | A | A | A |
| C1 | 4 | A (453 nm) | A | A | A | A |
| A2 | 5B | A (460 nm) | A | A | A | A |
| B2 | 2B | A (452 nm) | A | A | A | A |
| C2 | 6B | A (451 nm) | A | A | A | A |
| 101 | Dye A for Comparison | B (423 nm) | B | A | A | C |
| 102 | Dye B for Comparison | C (471 nm) | B | B | C | C |

Dye for comparison A

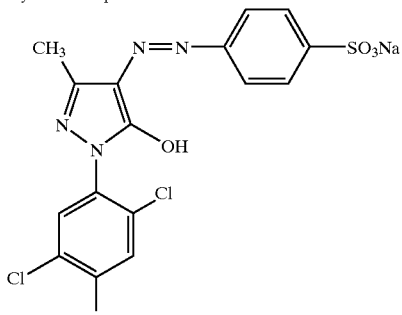

Dye for comparison B

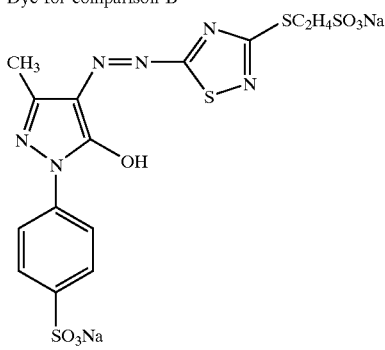

As can be seen from the results in Table 2, the ink-jet ink of the present invention exhibited excellent color tone, little dependence on paper, and excellent water resistance, light-fastness and resistance to ozone. In particular, it is apparent that the ink of the present invention was excellent in image storability, such as light resistance and ozone resistance. The ink of the present invention was also excellent in moist heat resistance.

Example 2

An image was printed on an ink jet paper photo glossy paper EX (trade name) manufactured by Fuji Photo Film Co., Ltd., using the same printer as in Example 1 using the same cartridge as in Example 1, to carry out the same evaluations as in Example 1. The similar results as in Example 1 were obtained.

Example 3

Each ink solution prepared in Example 1 was loaded into a cartridge of an ink-jet printer BJ-F850 (trade name, manufactured by CANON Inc.). Using the printer and a photo glossy paper GP-301 (trade name) manufactured by CANON Inc., images were printed. The prints underwent the same evaluations as in Example 1, and the similar results as in Example 1 were obtained.

Example 4

(Preparation of Ink Solution D1)

3.75 g of Dye 9 of the present invention, and 7.04 g of sodium dioctylsulfosuccinate were dissolved in 4.22 g of a high-boiling-point organic solvent (S-2) shown below, 5.63 g of a high-boiling-point organic solvent (S-11) shown below and 50 mL of ethyl acetate at 70° C. After that, to the resulting solution, was added 500 mL of deionized water, while stirring by means of a magnetic stirrer, to prepare an oil-in-water-type coarse dispersion. The coarse dispersion thus obtained was passed through a micro-fluidizer (manufactured by MICROFLUIDEX INC.) five times under a pressure of 600 bar, to obtain an emulsion having finer particles. Then, the resulting emulsion underwent a solvent-removing treatment by means of a rotary evaporator until the smell of ethyl acetate was lost. In this way, a fine emulsion of a hydrophobic dye was obtained. Then, 140 g of diethylene glycol, 50 g of glycerin, 7 g of SURFYNOL 465 (trade name, manufactured by Air Products & Chemicals Inc.), and 900 mL of deionized water were added to the fine emulsion, to prepare Ink solution D1.

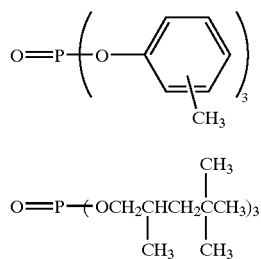

(Preparation of Ink Solution E1, D2, E2)

Ink solutions E1, D2 and E2, and ink solution for comparison 103 were prepared in the same manner as in the preparation of Ink solution D1, except that Dye 9 was replaced by any of the dyes in an equimolar amount as shown in the following Table 3.

(Image Recording and Evaluation)

The ink solutions D1, E1, D2 and E2, and ink solution for comparison 103 were underwent the following evaluations. The results are shown in Table 3.

In Table 3, "color tone (λmax)", "paper dependence", "water resistance", "light resistance" and "ozone gas resistance" have the same meanings under the test conditions and evaluation grades, as described in Example 1, respectively.

TABLE 3

| Sample No. | Dye | Color tone (λmax) | Paper dependence | Water resistance | Light resistance | Ozone resistance |
|---|---|---|---|---|---|---|
| D1 | 9 | A (450 nm) | A | A | A | A |
| E1 | 10 | A (452 nm) | A | A | A | A |
| D2 | 3B | A (451 nm) | A | A | A | A |
| E2 | 4B | A (452 nm) | A | A | A | A |
| 103 | Dye C for Comparison | B (430 nm) | B | B | C | C |

Dye for comparison C

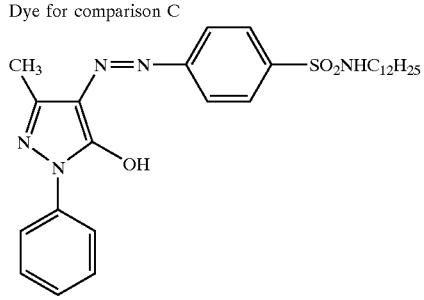

As is apparent from the results in Table 3, the ink of the present invention, for example, as an ink for ink jet exhibited excellent color-forming property and color tone, little dependence on paper, and excellent water resistance, light resistance and ozone resistance.

Example 5

An image was printed on an ink jet paper photo glossy paper EX (trade name) manufactured by Fuji Photo Film Co., Ltd., using the same printer as in Example 4 using the same cartridge as in Example 4, to carry out the same evaluations as in Example 4. The similar results as in Example 4 were obtained.

Example 6

Each ink solution prepared in Example 4 was loaded into a cartridge of an ink-jet printer BJ-F850 (trade name, manufactured by CANON Inc.). Using the printer and a photo glossy paper GP-301 (trade name) manufactured by CANON Inc., images were printed. The prints underwent the same evaluations as in Example 4, and the similar results as in Example 4 were obtained.

Example 7

3 parts by mass of Dye 9 of the present invention and 100 parts by mass of a toner resin (a styrene/acrylate copolymer; trade name: Himer TB-1000F (manufactured by Sanyo Chemical Industries, Ltd.), were mixed together and ground by a ball mill, and then the resultant mixture was fusion-mixed together by heating at 150° C., cooled, roughly ground by a hammer mill, and then finely ground by an air jet fine grinder. The obtained fine particles were classified to select particles as fine as 1 to 20 μm for use as a toner. Then, 10 parts by mass of the toner and 900 parts by mass of carrier iron powders (trade name: EFV250/400, manufactured by Nippon Teppun Co., Ltd.) were uniformly mixed together, to prepare a developing agent. Each sample was prepared in the same manner as above, except that 3 parts by mass of a dye or 6 parts by mass of a pigment was used as a colorant, as shown in Table 4. Reproduction (copying) was carried out by a dry PPC electrophotographic copier (trade name: NP-5000, manufactured by Canon Inc.) using any of these developing agents.

Evaluation tests were carried out in accordance with the following methods: by forming a reflection image (an image on a paper) and a transmission image (an OHP image), on a paper and an OHP, respectively, by the above-described image-forming method with a developing agent, using the color toner of the present invention. The deposition amount of the toner was within the range of 0.7±0.05 (mg/cm$^2$) in evaluation.

The hue and lightfastness of the thus-obtained images were evaluated. The hue was evaluated with the naked eye based on three grades: "excellent", "good" and "poor". The evaluation results are shown in Table 4 below. In Table 4, "○" represents excellent hue, "Δ" represents good hue, and "X" represents poor hue. As for lightfastness, after the density Ci of an image right after recording was measured, the image was exposed to xenon light (85,000 lx) for 5 days using a weather meter (Atlas C. 165), and the density Cf of the image was measured again, to calculate the dye retention rate ({(Ci−Cf)/Ci}×100%) from the difference in image density before and after exposure to xenon light, for evaluating. The density of the image was measured using a reflection densitometer (X-Rite310TR). The evaluation results are shown in Table 4 below. In Table 4 below, "○" indicates a dye residual rate of 90% or more, "Δ" indicates a dye residual rate of less than 90% but not less than 80%, and "X" indicates a dye residual rate of less than 80%.

The transparency of the OHP images was evaluated by the following method. The visible light transmittance of an image was measured, using that of an OHP sheet which did not carry a toner as a reference by using "330-Type Autographic Spectrophotometer", trade name, manufactured by Hitachi Ltd., to obtain a spectral transmission factor at 650 nm as an index of the transparency of the OHP image. As evaluation grades, "○" indicates a spectral transmission factor of 80% or more, "Δ" indicates a spectral transmission factor of more than 70% but less than 80%, and "X" indicates a spectral transmission factor of 70% or less. The results of the above measurements are shown in Table 4.

TABLE 4

|  | Colorant (Dye No.) | Hue | Lightfastness | Transparency |
|---|---|---|---|---|
| This invention | 9 | ○ | ○ | ○ |
| This invention | 10 | ○ | ○ | ○ |
| This invention | 3B | ○ | ○ | ○ |
| This invention | 4B | ○ | ○ | ○ |
| Comparative example | C. I. Solvent. Yellow 162 | Δ | Δ | Δ |

As is apparent from the results in Table 4, since accurate color reproduction and high OHP quality were obtained by using the color toner of the present invention, the color toner of the present invention is suitable for use as a full-color toner. As the color toner of the present invention was excellent in light resistance, the color toner of the present invention can provide an image which can be preserved for a long period of time.

Example 8
<Preparation of a Thermal Transfer Dye-providing Material>

A coating composition for a thermal transfer dye-providing layer having the following composition was applied onto a surface of a 6 μm-thick polyethylene terephthalate film (manufactured by Teijin Ltd.) whose back surface had been subjected to heat-resistant lubricating treatment, as a base, by wire-bar coating, to have a dry thickness of 1.5 μm, thereby preparing a thermal transfer dye-providing material (5-1A) as an ink sheet.

Coating Composition for Thermal Transfer Dye-donating Layer:

| Dye 21 | 10 mmol |
|---|---|
| Polyvinyl butyral resin (Denka Butyral 5000-A, tradename, manufactured by Denki Kagaku Kogyo K.K) | 3 g |
| Toluene | 40 ml |
| Methyl ethyl ketone | 40 ml |
| Polyisocyanate (TAKENATE D110N, trade name, manufactured by Takeda Chemical Industries, Ltd.) | 0.2 ml |

Other thermal transfer dye-providing materials (5-2A), (5-1B) and (5-2B) according to the present invention, and a thermal transfer dye-providing material (5-3) for comparison were prepared in the same manner as described above, except that the above Dye 21 was changed to another dye, as shown in Table 5, respectively. (Preparation of a thermal transfer image-receiving material)

The following composition was applied to a surface of a 150 μm-thick synthetic paper (YUPO-FPG-150 (trade name) manufactured by Oji Yuka Synthetic Paper Co., Ltd.) as a base, by wire-bar coating, to have a dry thickness of 8 μm, thereby preparing a thermal transfer image-receiving material. The thus-obtained coated film was pre-dried with a drier, and then dried in an oven heated at 100° C. for 30 minutes.

| Coating composition for an image-receiving layer: | |
|---|---|
| Polyester resin (Vilon-280, trade name, manufactured by Toyobo Co., Ltd.) | 22 g |
| Polyisocyanate (KP-90, trade name, manufactured by Dainippon Ink and Chemicals, Inc.) | 4 g |
| Amino-modified silicone oil (KF-857, trade name, manufactured by Shin-Etsu Silicones Co., Ltd.) | 0.5 g |
| Methyl ethyl ketone | 85 ml |
| Toluene | 85 ml |
| Cyclohexanone | 15 ml |

Any of the thus-obtained thermal transfer dye-providing materials (5-1A), (5-2A), (5-1B), (5-2B) and (5-3) and the thermal transfer image-receiving material were placed one upon the other such that the thermal transfer dye-donating layer and the image-receiving layer were brought into contact each other. Then, printing was performed from the support side of the thermal transfer dye-providing material, by using a thermal head, under the conditions of a thermal head output of 0.25 W/dot, a pulse width of 0.15 to 15 msec, and a dot density of 6 dots/mm, to fix, imagewise, a yellow dye on the image-receiving layer of the image-receiving material. The maximum color density of the obtained image is shown in Table 5. A clear image without transfer unevenness could be recorded with the thermal transfer dye-providing materials (5-1A), (5-2A), (5-1B) and (5-2B) according to the present invention. Then, the recorded thermal transfer image-receiving materials thus obtained were irradiated with Xe light (17,000 lx) for 5 days, to investigate the optical stability of a color image. The status A reflection density of a portion which showed a status A reflection density of 1.0 after irradiation was measured, and the stability of the portion was evaluated in a retention rate (percentage) for a reflection density of 1.0 before irradiation. The results are shown in Table 5.

TABLE 5

| Thermal transfer dye-providing material | Dye | Maximum color density | Fastness to light | Remarks |
|---|---|---|---|---|
| 5-1A | 21 | 1.8 | 91 | This invention |
| 5-2A | 22 | 1.7 | 89 | This invention |
| 5-1B | 3B | 2.2 | 100 | This invention |
| 5-2B | 4B | 2.4 | 99 | This invention |
| 5-3 | Dyed d for comparison | 1.8 | 52 | Comparative example |

Dye for comparison d

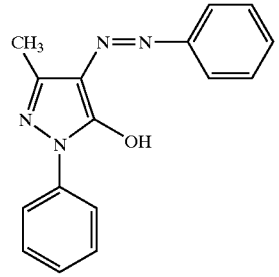

As described above, the dyes of the present invention exhibited superior fastness to light to the dye for comparison. Also, the dyes of the present invention had a bright hue.

Example 9

To prepare a color filter, a positive-type resist composition containing a thermosetting resin, a quinonediazido compound, a crosslinking agent, a dye and a solvent was applied to a silicon wafer by spin coating, and the resultant wafer was heated to evaporate the solvent and then exposed to light through a mask to decompose the quinone diazido compound. The coated wafer was heated if necessary, and subjected to development, to obtain a mosaic pattern. The exposure was carried out using HITACHI LD-5010-i (NA= 0.40) (trade name) i-ray exposure stepper manufactured by Hitachi, Ltd. SOPD or SOPD-B (each trade name) of Sumitomo Chemical Co., Ltd. was used as a developer.

<Preparation of Positive Resist Composition>

3.4 parts by mass of a cresol novolak resin (mass average molecular weight of 4,300 in terms of polystyrene) obtained from a mixture of: m-cresol/p-cresol/formaldehyde (reaction molar ratio=5/5/7.5), 1.8 parts by mass of o-naphthoquinonediazido-5-sulfonic acid ester (two hydroxyl groups were esterified on average) prepared using a phenol compound represented by the formula below, 0.8 parts by mass of hexamethoxymethylolmelamine, 20 parts by mass of ethyl lactate, and 1 part by mass of the dye of the present invention as shown in Table 6 were mixed together, to obtain the positive resist composition.

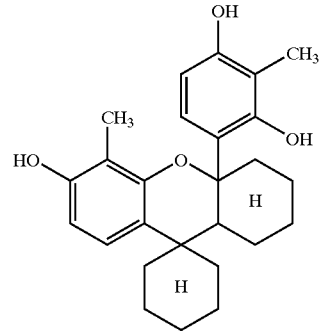

<Preparation of a Color Filter>

After the thus-obtained positive resist composition was applied to a silicon wafer by spin coating, the solvent was evaporated. After the exposure, the silicon wafer was heated at 100° C., and the exposed portion was removed by alkali development, to obtain a positive colored pattern having a resolution of 0.8 $\mu$m. The entire surface of the thus-obtained pattern was exposed to light, and then heated at 150° C. for 15 minutes, to obtain a yellow complementary color filter.

<Comparative Example>

A positive resist composition was obtained, by mixing 1 part by mass of Oleosol Yellow 2G (trade name) manufactured by Sumitomo Chemical Co., Ltd., in place of the yellow dye of the present invention used in the above Example. This positive resist composition was applied to a silicon wafer by spin coating, and then the solvent was evaporated. After exposure, the resulting silicon wafer was subjected to alkali development, to obtain a positive colored pattern having a resolution of 1 $\mu$m. The entire surface of the thus-obtained pattern was exposed to light, and then heated at 150° C. for 10 minutes, to obtain a yellow color filter.

<Evaluation>

The transmission spectrum of the thus-obtained yellow color filter was measured, to relatively evaluate the definitions (sharpness) on short-wavelength and long-wavelength sides of the spectrum, which are important for color reproduction. "○" means an excellent level, "Δ" means a permissible level, and "X" means an impermissible level. As for lightfastness, the obtained image was irradiation with xenon light (85,000 lx) using a weather meter (Atras C. I65), for 7 days, to measure the density of the image before and after irradiation with the xenon light. Evaluation was carried out using the dye retention (remaining) rate [(density after irradiation/density before irradiation)×100%].

TABLE 6

| | Dye No. | Absorption characteristics | Light-fastness |
|---|---|---|---|
| This invention | 21 | ○ | 98% |
| This invention | 22 | ○ | 96% |
| This invention | 3B | ○ | 99% |
| This invention | 4B | ○ | 99% |
| Comparative example | Oleosol Yellow 2G | Δ | 60% |

It is understood that the dyes of the present invention were excellent in color reproduction, with sharp definitions on short wavelength and long wavelength sides of the peak in interest of the spectrum, as compared with Comparative Example. It is also understood that the dyes of the present invention had excellent lightfastness, as compared with the compound for comparison.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An ink, comprising at least one dye represented by formula (1):

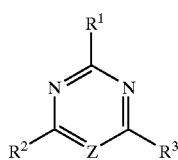

formula (1)

wherein $R^1$, $R^2$ and $R^3$ are each independently a hydrogen atom or a monovalent aroun; Z is a nitrogen atom, or a carbon atom to which a hydrogen atom or a monovalent group is bonded; and at least one of $R^1$, $R^2$, $R^3$, and the monovalent group that Z has is a substituent having a heterocyclic group substituted with an azo group, wherein, in formula (1), at least two of $R^1$, $R^2$ and $R^3$ each represent a substituent having a heterocyclic group substituted with an azo group.

2. An ink, comprising at least one dye represented by formula (3):

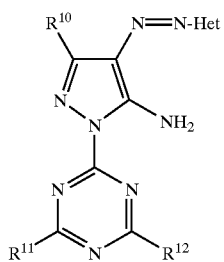

formula (3)

wherein $R^{10}$ is a hydrogen atom, an alkyl group, a cycloalkyl group, an aralkyl group, an alkoxy group or an aryl group; $R^{11}$ is a hydrogen atom, a halogen atom, a hydroxyl group, an alkoxy group, an amino group, a sulfo group or a heterocyclic group; Het is an aromatic heterocyclic group; and $R^{12}$ is a hydrogen atom, a halogen atom, a hydroxyl group, an alkoxy group, an amino group, a sulfo group, a heterocyclic group, or a group represented by formula (3-1):

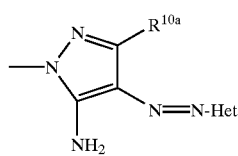

formula (3-1)

wherein, in formula (3-1), $R^{10a}$ is a hydrogen atom, an alkyl group, a cycloalkyl group, an aralkyl group, an alkoxy group or an aryl group; and Het is an aromatic heterocyclic group;

in the formula (3), each group on the dye may have a substituent.

3. The ink according to claim 2, wherein, in formula (3), $R^{12}$ is a hydrogen atom, a halogen atom, a hydroxyl group, an alkoxy group, an amino group, a sulfo group or a heterocyclic group.

4. The ink according to claim 2, wherein, in formula (3), $R^{12}$ is a group represented by the formula (3-1).

5. An ink-jet-recording method, comprising the step of:

forming an image with an ink on an image-receiving material having an ink-receiving layer containing white inorganic pigment particles on a support, wherein the ink comprises at least one dye represented by formula (1):

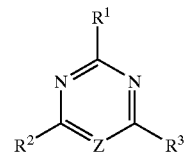

formula (1)

wherein, in formula (1), $R^1$, $R^2$ and $R^3$ are each independently a hydrogen atom or a monovalent group; Z is a nitrogen atom, or a carbon atom to which a hydrogen atom or a monovalent group is bonded; and at least one of $R^1$, $R^2$, $R^3$, and the monovalent group that Z has is a substituent having a heterocyclic group substituted with an azo group, wherein, in formula (1), at least two of $R^1$, $R^2$ and $R^3$ each represent a substituent having a heterocyclic group substituted with an azo group.

6. An ink-jet-recording method, comprising the step of:

forming an image with an ink on an image-receiving material having an ink-receiving layer containing white inorganic pigment particles on a support, wherein the ink comprises at least one dye represented by formula (3):

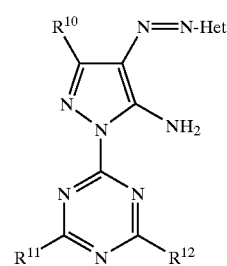

formula (3)

wherein $R^{10}$ is a hydrogen atom, an alkyl group, a cycloalkyl group, an aralkyl group, an alkoxy group or an aryl group; $R^{11}$ is a hydrogen atom, a halogen atom, a hydroxyl group, an alkoxy group, an amino group, a sulfo group or a heterocyclic group; Het is an aromatic heterocyclic group; and $R^{12}$ is a hydrogen atom, a halogen atom, a hydroxyl group, an alkoxy group, an amino group, a sulfo group, a heterocyclic group, or a group represented by formula (3-1):

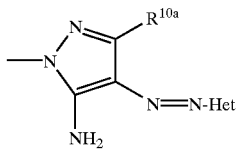

formula (3-1)

wherein, in formula (3-1), $R^{10a}$ is a hydrogen atom, an alkyl group, a cycloalkyl group, an aralkyl group, an alkoxy group or an aryl group; and Het is an aromatic heterocyclic group;

in the formula (3), each group on the dye may have a substituent.

7. The ink-jet-recording method according to claim 6, wherein, in formula (3), $R^{12}$ is a hydrogen atom, a halogen atom, a hydroxyl group, an alkoxy group, an amino group, a sulfo group or a heterocyclic group.

8. The ink-jet-recording method according to claim 6, wherein, in formula (3), $R^{12}$ is a group represented by the formula (3-1).

9. A compound represented by formula (3):

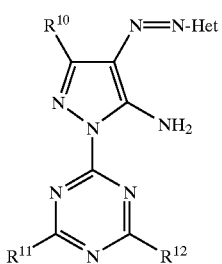

formula (3)

wherein $R^{10}$ is a hydrogen atom, an alkyl group, a cycloalkyl group, an aralkyl group, an alkoxy group or an aryl group; $R^{11}$ is a hydrogen atom, a halogen atom, a hydroxyl group, an alkoxy group, an amino group, a sulfo group or a heterocyclic group; Het is an aromatic heterocyclic group; and $R^{12}$ is a hydrogen atom, a halogen atom, a hydroxyl group, an alkoxy group, an amino group, a sulfo group, a heterocyclic group, or a group represented by formula (3-1):

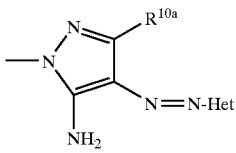

formula (3-1)

wherein, in formula (3-1), $R^{10a}$ is a hydrogen atom, an alkyl group, a cycloalkyl group, an aralkyl group, an alkoxy group or an aryl group; and Het is an aromatic heterocyclic group;

in the formula (3), each group on the compound may have a substituent.

10. The compound according to claim 9, wherein, in formula (3), $R^{12}$ is a hydrogen atom, a halogen atom, a hydroxyl group, an alkoxy group, an amino group, a sulfo group or a heterocyclic group.

11. The compound according to claim 9, wherein, in formula (3). $R^{12}$ is a group represented by the formula (3-1).

12. The compound according to claim 9, which is represented by formula (4):

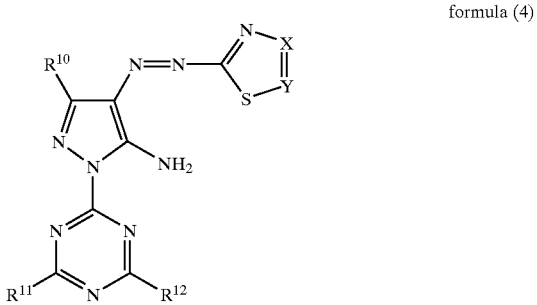

formula (4)

wherein $R^{10}$ is a hydrogen atom, an alkyl group, a cycloalkyl group, an aralkyl group, an alkoxy group or an aryl group; $R^{11}$ is a hydrogen atom, a halogen atom, a hydroxyl group, an alkoxy group, an amino group, a sulfo group or a heterocyclic group; one of X and Y is a nitrogen atom and the other is a —C(—$R^{13}$)= group; $R^{13}$ is a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group; and $R^{12}$ is a hydrogen atom, a halogen atom, a hydroxyl group, an alkoxy group, an amino group, a sulfo group, a heterocyclic group, or a group represented by formula (4-1):

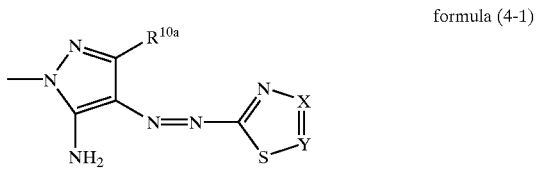

formula (4-1)

wherein, in formula (4-1), $R^{10a}$ is a hydrogen atom, an alkyl group, a cycloalkyl group, an aralkyl group, an alkoxy group or an aryl group; and X and Y have the same meanings as those in formula (4); and in the formula (4), each group on the compound may have a substituent.

13. The compound according to claim 12, wherein, in formula (4), $R^{12}$ is a hydrogen atom, a halogen atom, a hydroxyl group, an alkoxy group, an amino group, a sulfo group or a heterocyclic group.

14. The compound according to claim 12, wherein, in formula (4), $R^{12}$ is a group represented by the formula (4-1).

* * * * *